(12) United States Patent
Sievers et al.

(10) Patent No.: US 8,382,563 B2
(45) Date of Patent: Feb. 26, 2013

(54) MULTI-ZONE CONTROL MODULE FOR A HEATING, VENTILATION, AND AIR CONDITIONING SYSTEM

(75) Inventors: Eckart Sievers, Frechen (DE); David Lumley, Livonia, MI (US); Jim Nolta, Jr., Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1276 days.

(21) Appl. No.: 11/937,096

(22) Filed: Nov. 8, 2007

(65) Prior Publication Data

US 2009/0124187 A1 May 14, 2009

(51) Int. Cl.
*B60H 1/00* (2006.01)
*B60H 1/04* (2006.01)

(52) U.S. Cl. ........... 454/126; 454/75; 454/156; 454/143

(58) Field of Classification Search .............. 454/126, 454/75, 156, 143
See application file for complete search history.

(56) References Cited

U.S. PATENT DOCUMENTS

| | | | |
|---|---|---|---|
| 4,473,109 A | 9/1984 | Kojima et al. | |
| 4,482,009 A * | 11/1984 | Nishimura et al. | 454/75 |
| 4,763,564 A | 8/1988 | Czarnecki et al. | |
| 5,106,018 A * | 4/1992 | Loup | 454/126 |
| 5,186,237 A | 2/1993 | Adasek et al. | |
| 5,516,041 A * | 5/1996 | Davis et al. | 454/75 |
| 5,934,989 A * | 8/1999 | Yamamoto | 454/156 |
| 6,062,298 A * | 5/2000 | Lee | 454/126 |
| 6,145,754 A * | 11/2000 | Uemura et al. | 454/126 |
| 6,152,217 A | 11/2000 | Ito et al. | |
| 6,206,092 B1 * | 3/2001 | Beck et al. | 454/156 |
| 6,213,198 B1 * | 4/2001 | Shikata et al. | 454/161 |
| 6,308,770 B1 * | 10/2001 | Shikata et al. | 454/156 |
| 6,397,942 B1 | 6/2002 | Ito et al. | |
| 6,425,818 B1 * | 7/2002 | Auvity et al. | 454/126 |
| 6,427,770 B2 * | 8/2002 | Beck et al. | 454/156 |
| 6,491,578 B2 | 12/2002 | Yoshinori et al. | |
| 6,569,009 B2 | 5/2003 | Nishikawa et al. | |
| 6,607,029 B2 * | 8/2003 | Danieau | 454/126 |
| 6,644,559 B2 | 11/2003 | Kondo et al. | |
| 6,772,833 B2 * | 8/2004 | Auer et al. | 454/121 |
| 6,782,944 B2 * | 8/2004 | Kim et al. | 454/156 |
| 6,789,607 B1 * | 9/2004 | Jun et al. | 454/156 |
| 6,804,973 B2 | 10/2004 | Sugiura | |
| 6,814,137 B2 | 11/2004 | Tsurushima et al. | |
| 6,852,024 B2 * | 2/2005 | Seki | 454/121 |
| 6,871,696 B2 | 3/2005 | Aoki et al. | |
| 6,881,140 B2 | 4/2005 | Le | |
| 6,913,529 B2 * | 7/2005 | Seki | 454/121 |
| 6,929,312 B2 | 8/2005 | Rich et al. | |
| 6,971,246 B2 | 12/2005 | Kurata et al. | |
| 7,055,591 B2 * | 6/2006 | Kang et al. | 454/156 |
| 7,063,612 B2 * | 6/2006 | Kaszycki | 454/126 |
| 7,563,159 B2 * | 7/2009 | Newman et al. | 454/156 |
| 7,575,511 B2 * | 8/2009 | Haupt et al. | 454/156 |
| 8,091,623 B2 * | 1/2012 | Hackl et al. | 454/156 |
| 2001/0008148 A1 | 7/2001 | Ito et al. | |

(Continued)

*Primary Examiner* — Steven B McAllister
*Assistant Examiner* — Phillip E Decker
(74) *Attorney, Agent, or Firm* — Fraser Clemens Martin & Miller LLC; J. Douglas Miller

(57) ABSTRACT

A control module for a heating, ventilating, and air conditioning system for a vehicle is disclosed, wherein a cost and a space requirement for the system are minimized and a control of temperature, mode, and volume of an air flow in a passenger compartment of the vehicle is optimized.

20 Claims, 10 Drawing Sheets

U.S. PATENT DOCUMENTS

| | | |
|---|---|---|
| 2002/0017798 A1 | 2/2002 | Shikata et al. |
| 2002/0025772 A1* | 2/2002 | Egami et al. .................. 454/126 |
| 2003/0037918 A1* | 2/2003 | Lee et al. ...................... 165/202 |
| 2004/0016536 A1* | 1/2004 | Auer et al. ....................... 454/69 |
| 2005/0124284 A1* | 6/2005 | Newman et al. .............. 454/156 |
| 2005/0159097 A1* | 7/2005 | Newman et al. .............. 454/156 |
| 2005/0170769 A1* | 8/2005 | Kaszycki ....................... 454/156 |
| 2006/0000594 A1* | 1/2006 | Kang et al. .................... 165/203 |
| 2006/0000595 A1* | 1/2006 | Kang et al. .................... 165/203 |
| 2007/0000255 A1 | 1/2007 | Elliot et al. |
| 2007/0095517 A1* | 5/2007 | Schall ............................. 454/75 |
| 2007/0125521 A1* | 6/2007 | Itou ................................. 165/96 |
| 2007/0144728 A1 | 6/2007 | Kinmartin et al. |
| 2008/0108293 A1* | 5/2008 | Haupt et al. ................... 454/156 |
| 2008/0146138 A1* | 6/2008 | Sikorski ........................ 454/143 |
| 2010/0043470 A1* | 2/2010 | Kang et al. .................... 454/141 |

\* cited by examiner

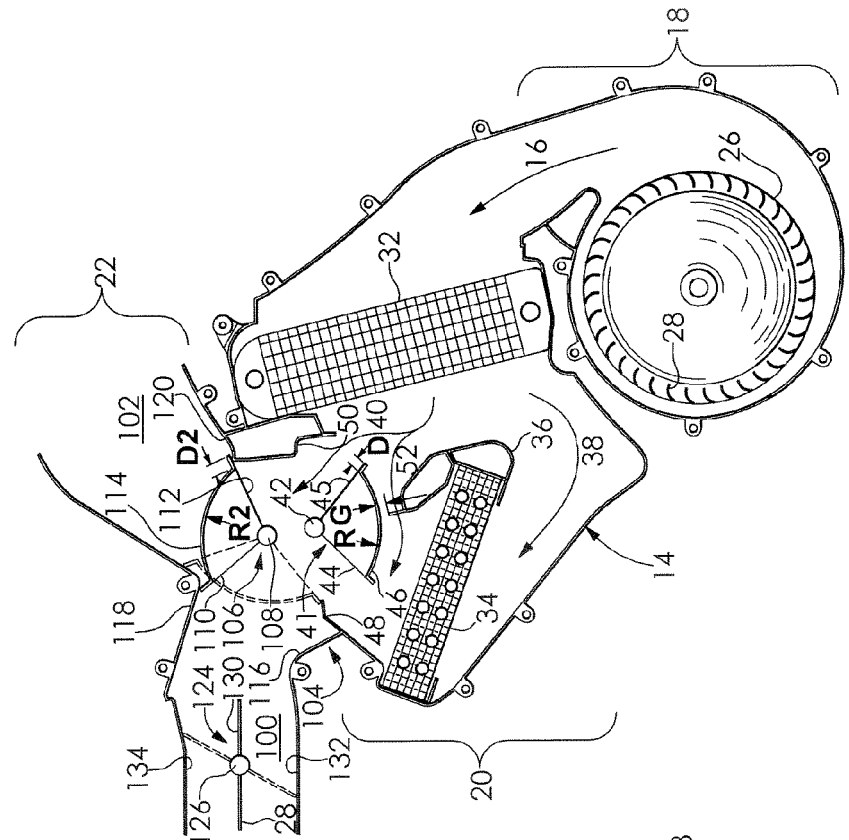
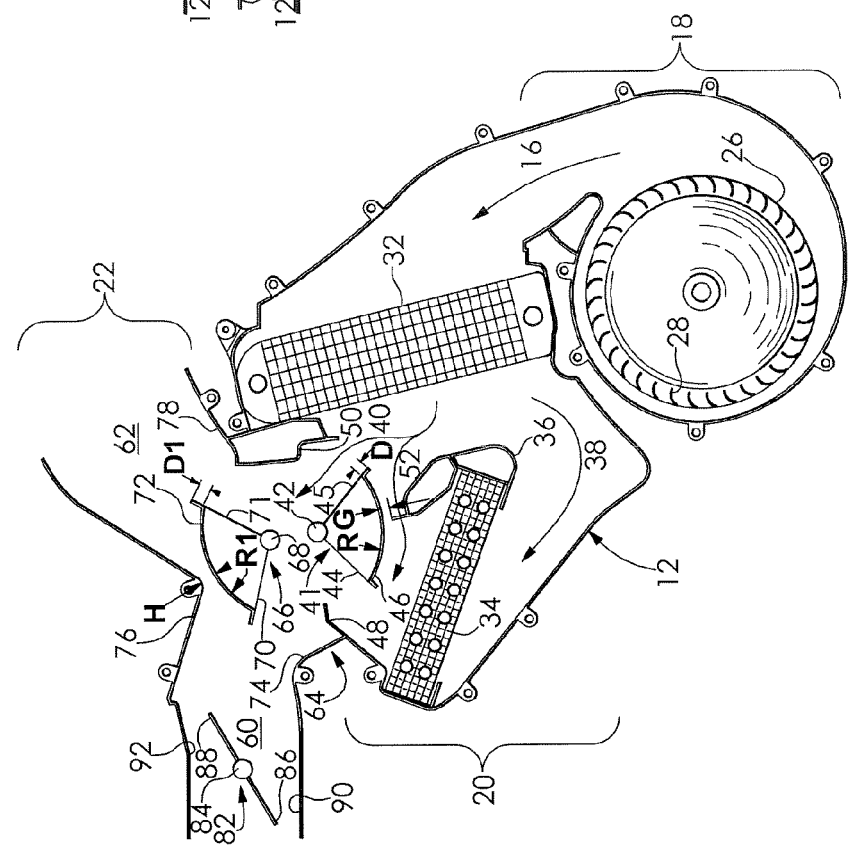
FIG. 4A
FIG. 4B

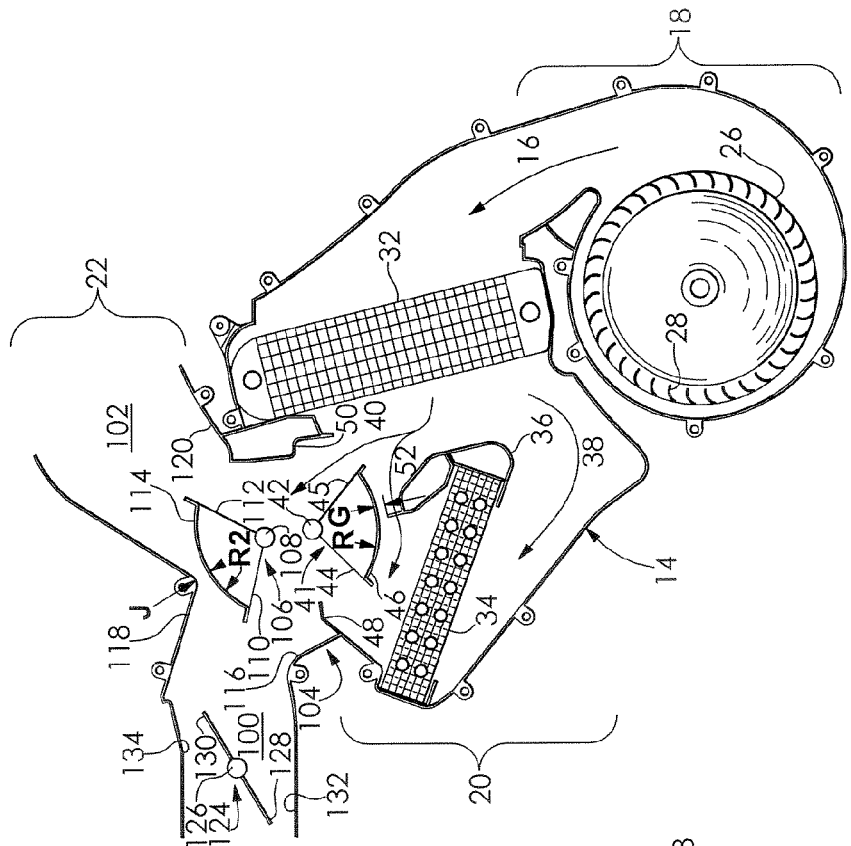
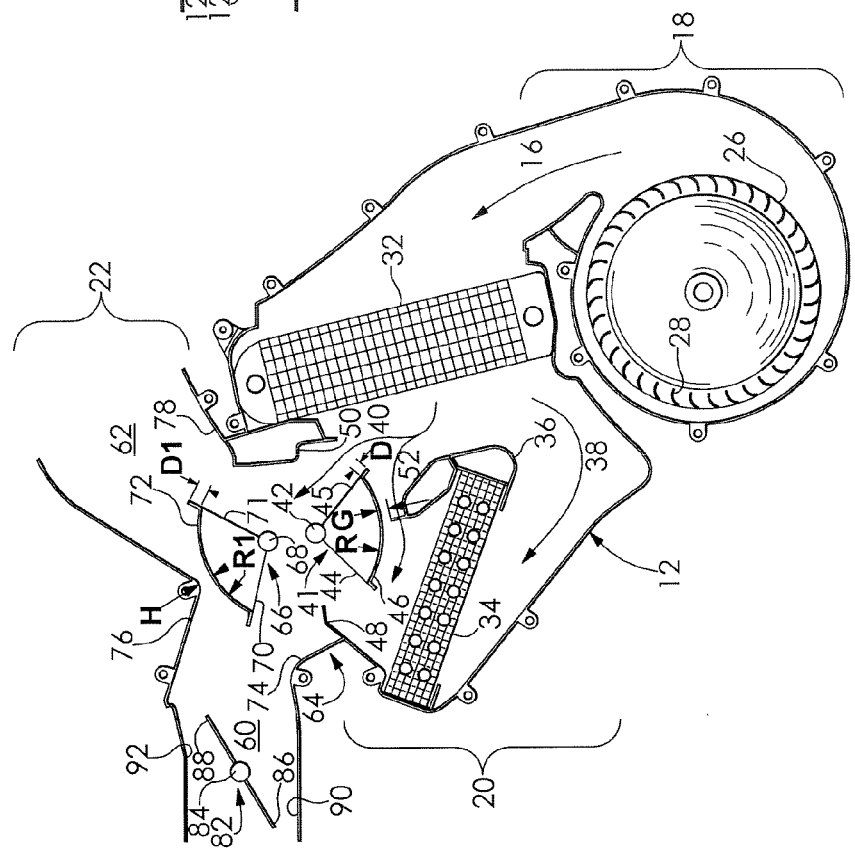
FIG. 5A
FIG. 5B

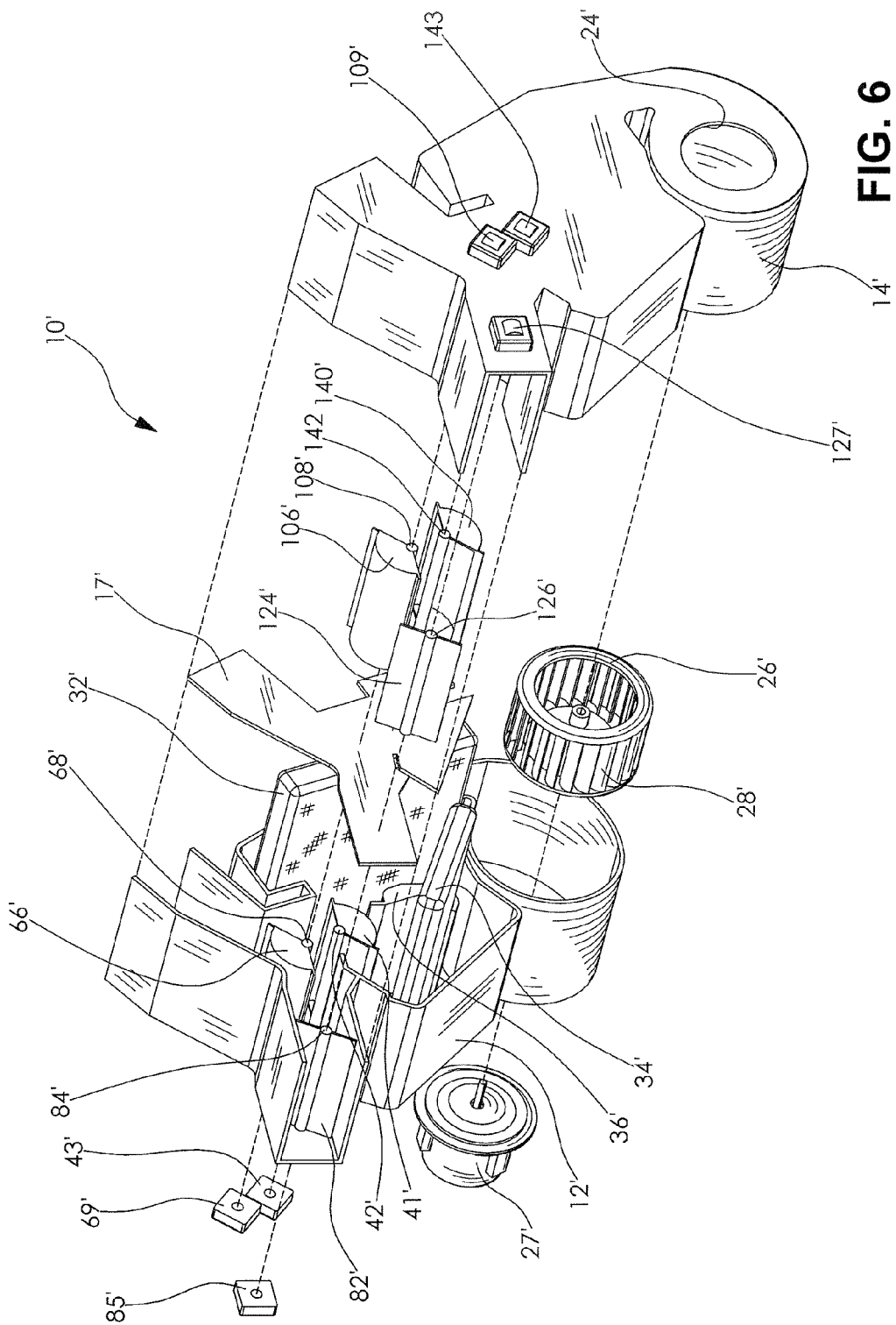

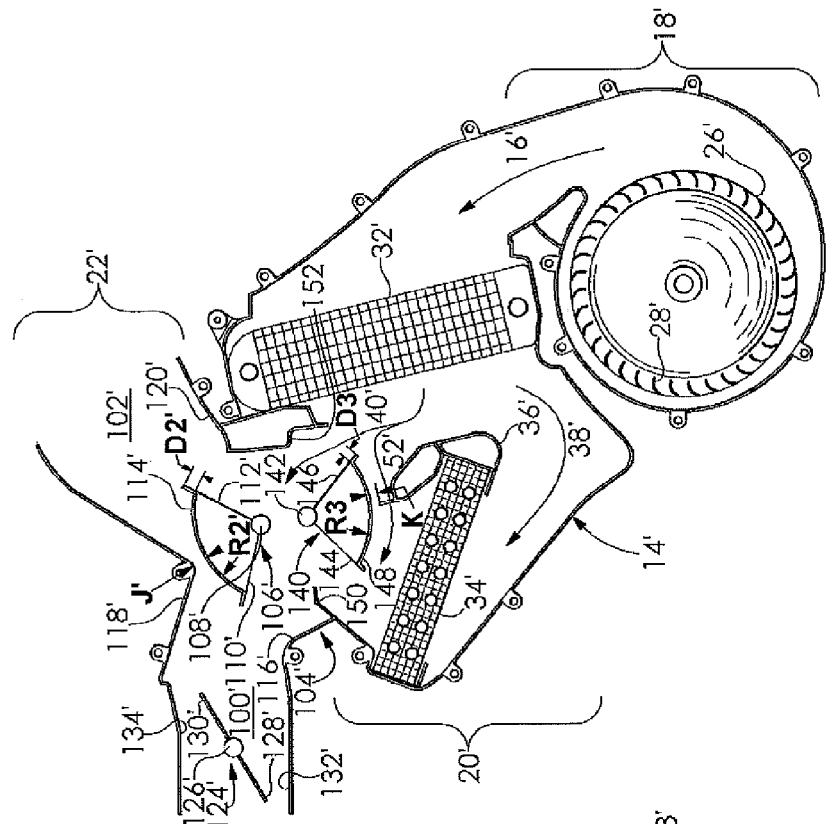
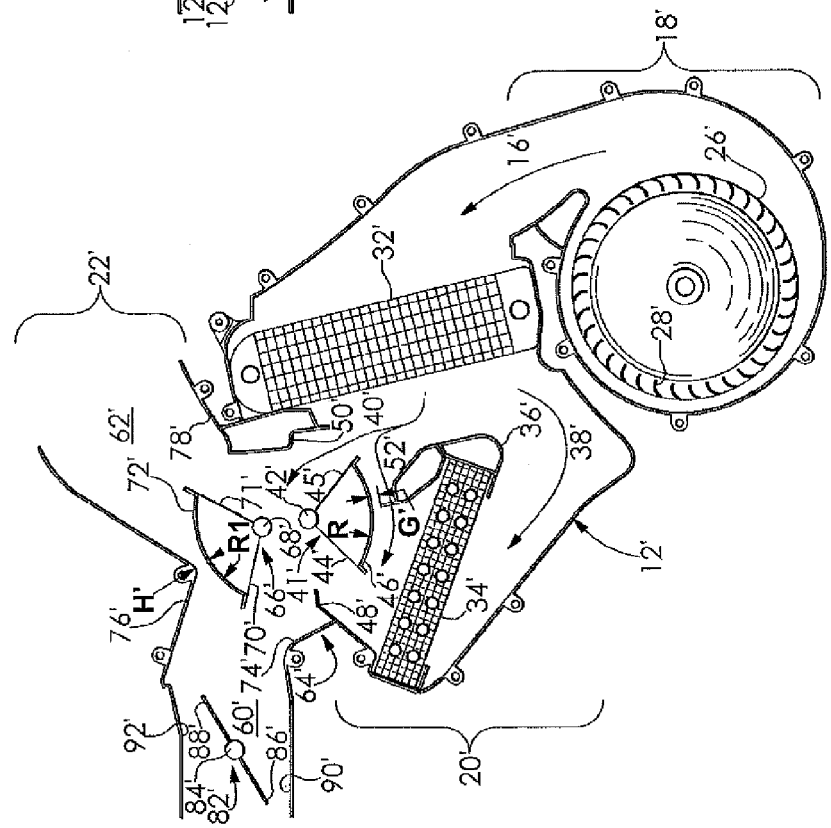
FIG. 10B
FIG. 10A

MULTI-ZONE CONTROL MODULE FOR A HEATING, VENTILATION, AND AIR CONDITIONING SYSTEM

FIELD OF THE INVENTION

The invention relates to a climate control system for a vehicle and more particularly to a multi-zone control module for a heating, ventilating, and air conditioning system for the vehicle.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The HVAC air-handling system conditions air flowing therethrough and distributes the conditioned air throughout the passenger compartment.

Vehicle passengers often prefer personalized comfort within a specific zone of the passenger compartment. This can be provided by individualized temperature, mode, and volume control of the air flow. In order to accomplish individualized temperature, mode, and volume control of the air flow within the passenger compartment, the passenger compartment is divided into independent control zones.

Individualized control is often referred to in the art as multi-zone control. For example, one zone may be a front seat portion of the passenger compartment of the vehicle. This zone can be subdivided into a front driver-side zone and a front passenger-side zone. Another zone may be the rear passenger portion of the vehicle.

Preferably, the temperature, mode, and volume of air flow within each zone can be independently controlled. As is known in the art, dual-zone control typically refers to independent control of two zones including the front driver-side zone and the front passenger side zone. Similarly, tri-zone control typically refers to independent control of three zones including the front driver-side zone, the front passenger-side zone, and the rear passenger zone.

Prior art multi-zone temperature control including the rear passenger zone has been provided by an auxiliary HVAC air-handling system for the rear zone in the vehicle. While the prior art auxiliary rear HVAC air-handling systems perform adequately, independent control of a driver side rear passenger zone and a passenger side rear passenger zone has yet to be cost effectively and efficiently facilitated.

It would be desirable to produce a control module for an HVAC air-handling system for a vehicle, wherein a cost and a space requirement for the module are minimized and a blend, a mode, and a volume of air flow in each zone may be independently controlled.

SUMMARY OF THE INVENTION

In concordance and agreement with the present invention, a control module for an HVAC air-handling system for a vehicle, wherein a cost and a space requirement for the module are minimized and a temperature, a mode, and a volume of air flow in each zone may be independently controlled, has surprisingly been discovered.

In one embodiment, the control module for a heating, ventilating, and air conditioning system comprises a housing forming an air flow conduit therein, the housing having an inlet providing fluid communication between a supply of air and the air flow conduit; an evaporator disposed in the housing assembly downstream of the inlet; a heater core disposed in the housing assembly downstream of the evaporator; at least one divider disposed in the housing assembly to partition the air flow conduit into a first sub-passage and a second sub-passage; at least one blend door disposed in the air flow conduit, the blend door selectively positionable between a first position and a second position, wherein the blend door permits a flow of air through a first flow path and militates against the flow of air through a second flow path when positioned in the first position, and permits the flow of air through the second flow path and militates against the flow of air through the first flow path when positioned in the second position, the blend door permitting the flow of air through the first flow path and the second flow path when positioned intermediate the first position and the second position; a plurality of mode doors, one of the mode doors disposed in the first sub-passage and another of the mode doors disposed in the second sub-passage, each of the mode doors selectively positionable between a first position and a second position, wherein the mode doors permit a flow of conditioned air through a first outlet and militate against the flow of conditioned air through a second outlet when positioned in the first position, and permit the flow of conditioned air through the second outlet and militate against the flow of conditioned air through the first outlet when positioned in the second position, the mode doors permitting the flow of conditioned air through the first outlet and the second outlet when positioned intermediate the first position and the second position; and a plurality of volume doors, one of the volume doors disposed in at least one of the first outlet and the second outlet of the first sub-passage and another of the volume doors disposed in at least one of the first outlet and the second outlet of the second sub-passage, each of the volume doors selectively positionable between a first position and a second position, wherein the volume doors permit the flow of a volume of conditioned air through the at least one of the first outlet and the second outlet in the first position and militate against the flow of a volume of conditioned air through the at least one of the first outlet and the second outlet when positioned in the second position, the volume doors permitting the flow of a volume of conditioned air less than the volume of conditioned air permitted to flow in the first position through the at least one of the first outlet and the second outlet when positioned intermediate the first position and the second position.

In another embodiment, the control module for a heating, ventilating, and air conditioning system for a vehicle comprises a housing assembly having a first housing and a second housing forming an air flow conduit therein, the housing assembly having an inlet providing fluid communication between a supply of air and the air flow conduit, wherein the first housing is adapted to supply conditioned air to a driver side of a passenger compartment and the second housing is adapted to supply the conditioned air to a passenger side of the passenger compartment; an evaporator disposed in the housing assembly downstream of the inlet; a heater core disposed in the housing assembly downstream of the evaporator; at least one divider disposed between the first housing and the second housing to partition the air flow conduit into a first sub-passage and a second sub-passage; at least one blend door disposed in the air flow conduit, the blend door selectively positionable between a first position and a second position, wherein the blend door permits a flow of air through a first flow path and militates against the flow of air through a second flow path when positioned in the first position, and permits the flow of air through the second flow path and militates against the flow of air through the first flow path when positioned in the second position, the blend door permitting the flow of air through the first flow path and the second flow path when positioned intermediate the first position and the second position; a plurality of mode doors, one of the mode doors disposed in the first sub-passage and another of the mode doors disposed in the second sub-passage, each of the mode doors selectively positionable between a first position and a second position, wherein the mode doors permit a flow of conditioned air through a first outlet adapted to supply the conditioned air to a floor area of the passenger compartment and militate against the flow of conditioned air through a second outlet adapted to supply the conditioned air to a headliner area of the passenger compartment when positioned in the first position, and permit the flow of conditioned air through the second outlet and militate against the flow of conditioned air through the first outlet when positioned in the second position, the mode doors permitting the flow of conditioned air through the first outlet and the second outlet when positioned intermediate the first position and the second position; a first volume door disposed in the first outlet of the first sub-passage, the volume door selectively positionable between a first position and a second position, wherein the volume door permits the flow of a volume of conditioned air through the first outlet in the first position and militates against the flow of a volume of conditioned air through the second outlet when positioned in the second position, the volume door permitting the flow of a volume of conditioned air less than the volume of conditioned air permitted to flow in the first position through the first outlet and the second outlet when positioned intermediate the first position and the second position; a second volume door disposed in the first outlet of the second sub-passage, the volume door selectively positionable between a first position and a second position, wherein the volume door permits the flow of a volume of conditioned air through the first outlet in the first position and militates against the flow of a volume of conditioned air through the second outlet when positioned in the second position, the volume door permitting the flow of a volume of conditioned air less than the volume of conditioned air permitted to flow in a first position through the first outlet and the second outlet when positioned intermediate the first position and the second position; and a motor coupled to the housing, the motor capable of controlling a rate of air flow through the air flow conduit by selectively increasing and decreasing a rotational motion of a blower wheel disposed in the housing.

In another embodiment, the rear control module for a heating, ventilating, and air conditioning system for a vehicle comprises a housing assembly having a first housing and a second housing forming an air flow conduit therein, the housing assembly having a cold air inlet providing fluid communication between a supply of cold air and the air flow conduit, wherein the first housing is adapted to supply conditioned air to a driver side of a passenger compartment and the second housing is adapted to supply the conditioned air to a passenger side of the passenger compartment; an evaporator disposed in the housing assembly downstream of the cold air inlet; a heater core disposed in the housing assembly downstream of the evaporator; at least one divider disposed between the first housing and the second housing to partition the air flow conduit into a first sub-passage and a second sub-passage; at least one blend door disposed in the air flow conduit, the blend door selectively positionable between a first position and a second position, wherein the blend door permits a flow of hot air through a hot air flow path and militates against a flow of cold air through a cold air flow path when positioned in the first position, and permits the flow of cold air through the cold air flow path and militates against the flow of hot air through the hot air flow path when positioned in the second position, the blend door permitting the flow of hot air through the hot air flow path and the flow of cold air through the cold air flow path when positioned intermediate the first position and the second position; a plurality of mode doors, one of the mode doors disposed in the first sub-passage and another of the mode doors disposed in the second sub-passage, each of the mode doors selectively positionable between a first position and a second position, wherein the mode doors permit a flow of conditioned air through a floor outlet adapted to supply the conditioned air to a floor area of the passenger compartment and militate against the flow of conditioned air through a headliner outlet adapted to supply the conditioned air to a headliner area of the passenger compartment when positioned in the first position, and permit the flow of conditioned air through the headliner outlet and militate against the flow of conditioned air through the floor outlet when positioned in the second position, the mode doors permitting the flow of conditioned air through the floor outlet and the headliner outlet when positioned intermediate the first position and the second position; a first volume door disposed in the floor outlet of the first sub-passage, the volume door selectively positionable between a first position and a second position, wherein the volume door permits the flow of a volume of conditioned air through the floor outlet in the first position and militates against the flow of a volume of conditioned air through the floor outlet when positioned in the second position, the volume door permitting the flow of a volume of conditioned air less than the volume of conditioned air permitted to flow in the first position through the floor outlet and the headliner outlet when positioned intermediate the first position and the second position; a second volume door disposed in the floor outlet of the second sub-passage, the volume door selectively positionable between a first position and a second position, wherein the volume door permits the flow of a volume of conditioned air through the floor outlet in the first position and militates against the flow of a volume of conditioned air through the floor outlet when positioned in the second position, the volume door permitting the flow of a volume of conditioned air less than the volume of conditioned air permitted to flow in the first position through the floor outlet and the headliner outlet when positioned intermediate the first position and the second position; and a motor coupled to the housing, the motor capable of controlling a rate of air flow through the air flow conduit by selectively increasing and decreasing a rotational motion of a blower wheel disposed in the housing, wherein the position of the at least one blend door, the mode doors, and the volume doors together with the motor selectively increasing and decreasing the rotational motion of the blower wheel, provide the floor outlet and the headliner outlet of the first sub-passage and the floor outlet and the headliner outlet of the second sub-passage with a desired temperature and volume of air flow.

Advantages of the above embodiments are that the module performs the function of multiple blower wheels and associated motors and provides dual mode capability, and temperature and volume control without a cost and a weight of additional components.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4A is a schematic plan view of the first housing of the module illustrated in FIG. 1 showing each of the blend door, the mode door, and the air flow volume door in an intermediate position;

FIG. 4B is a schematic plan view of the second housing of the module illustrated in FIG. 1 showing each of the mode door and the air flow volume door in the first position and the second position indicated by dashed lines;

FIG. 5A is a schematic plan view of the first housing of the module illustrated in FIG. 1 showing each of the blend door, the mode door, and the air flow volume door in the intermediate position;

FIG. 5B is a schematic plan view of the second housing of the module illustrated in FIG. 1 showing each of the blend door, the mode door, and the air flow volume door in the intermediate position;

FIG. 6 is a partially exploded perspective view of a control module for a heating, ventilating and air conditioning system according to another embodiment of the invention;

FIG. 10A is a schematic plan view of the first housing of the module illustrated in FIG. 6 showing each of the blend door, the mode door, and the air flow volume door in the intermediate position; and FIG. 10B is a schematic plan view of the second housing of the module illustrated in FIG. 6 showing each of the blend door, the mode door, and the air flow volume door in the intermediate position.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
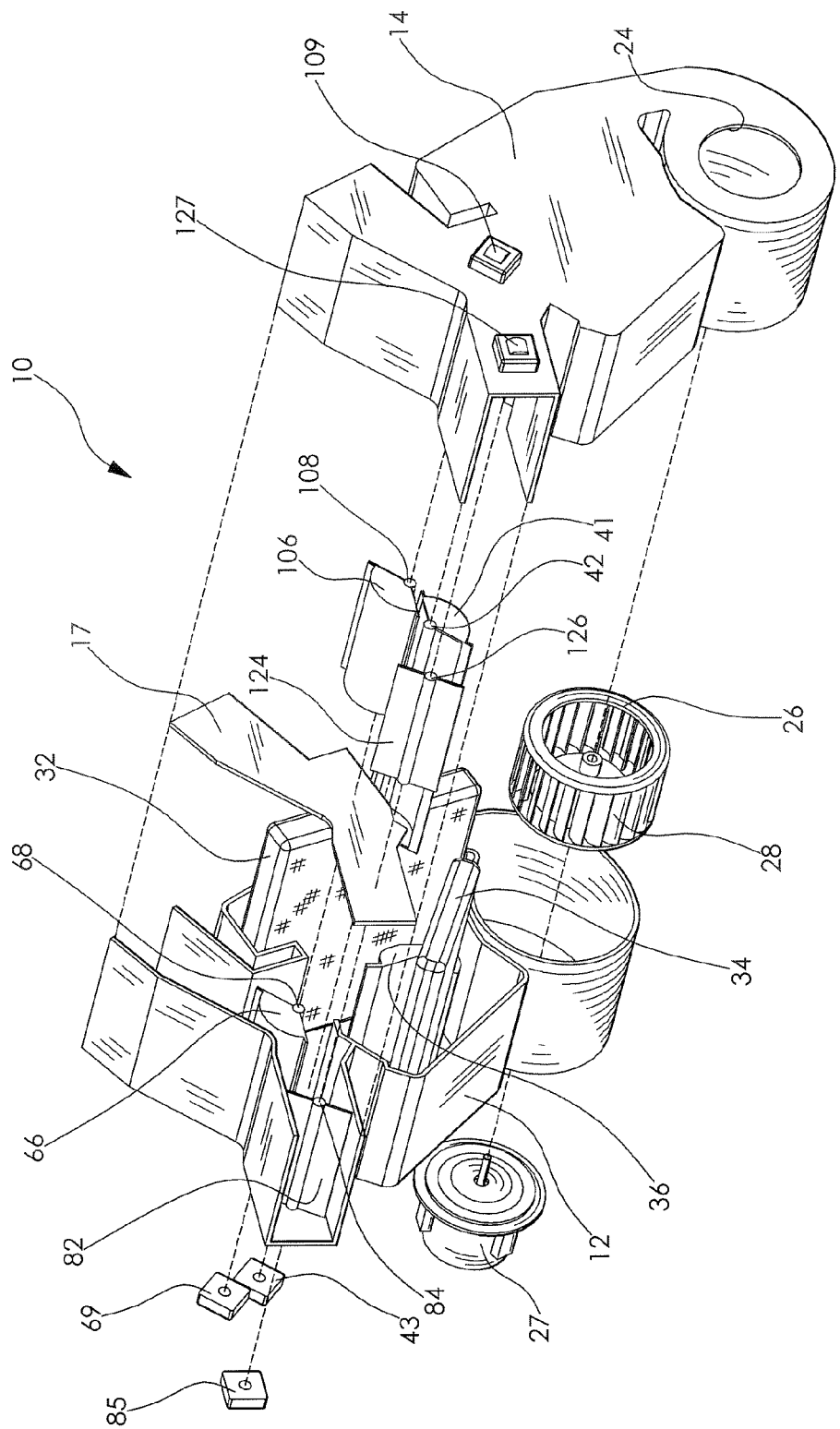
FIG. 1 is a partially exploded perspective view of a control module for a heating, ventilating and air conditioning system according to an embodiment of the invention.

FIG. 1 shows a control module 10 of a heating, ventilating, and air conditioning (HVAC) system or climate control system according to an embodiment of the invention. As used herein the term air refers to a fluid in a gaseous state. The module 10 typically provides heating, ventilation, and air conditioning for a plurality of passenger zones (not shown) in a passenger compartment of a vehicle (not shown). Each of the passenger zones includes at least one air flow area such as a headliner area, a floor area, and a defrost area. In the embodiment shown, the module 10 includes dependent air flow temperature control for each passenger zone. Although the embodiment shown and described herein is a rear dual-zone air-handling system, it is understood that the invention can be used with other types of air-handling systems disposed in the vehicle as desired, such as a lateral or "handed", a center mount and a semi-center mount, for example. It is also understood that the invention applies to other multi-zone systems such as a tri-zone system and a quad-zone system, for example.

The module 10 includes a first housing 12 and a second housing 14, substantially the same as the first housing 12 and adapted to be joined therewith. In the embodiment shown, the first housing 12 and the second housing 14 are produced from plastic and are joined with each other. It is understood that the first housing 12 and the second housing 14 can be formed from other materials as desired. The first housing 12 and the second housing 14 cooperate to form a hollow main housing assembly with an air flow conduit 16, as shown in FIGS. 2A thru 5B, formed therein. A divider 17 is typically disposed between the first housing 12 and the second housing 14 to form a first sub-passage and a second sub-passage and separate a flow of air therethrough.

As illustrated in FIGS. 2A thru 5B the first housing 12 and the second housing 14 include an inlet section 18, a mixing and conditioning section 20, and an outlet and distribution section 22. The inlet section 18, the mixing and conditioning section 20, and the outlet and distribution section 22 of the first housing 12 are adapted to abut the inlet section 18, the mixing and conditioning section 20, and the outlet and distribution section 22, respectively, of the second housing 14. In the embodiment shown, an air inlet 24 is formed in the inlet section 18 of at least one of the housings 12, 14. The air inlet 24 is in fluid communication with a supply of air (not shown). A filter (not shown) can be provided upstream or downstream of the inlet section 18 if desired. The supply of air can be provided from outside of the vehicle, recirculated from the passenger compartment of the vehicle, or a mixture of the two, for example.

The inlet section 18 is adapted to receive a blower wheel 26 therein. A motor 27 is coupled to the blower wheel 26 to impart rotational motion to the blower wheel 26. Any conventional motor type can be employed such as an electrically powered motor, for example. The blower wheel 26 includes a plurality of blades 28 disposed thereon. The blades 28 cause air to be drawn through the air inlet 24. The air is expelled radially outwardly from the blower wheel 26 during the rotational motion thereof. The motor 27 is adapted to selectively increase and decrease the rotational motion of the blower wheel 26, thereby controlling a rate of air flow through the air flow conduit 16.

The mixing and conditioning section 20 is adapted to receive an evaporator core 32 and a heater core 34 therein. The evaporator core 32 and the heater core 34 are in communication with a source of cooled fluid (not shown) and a source of heated fluid (not shown), respectively. A first end of the heater core 34 is disposed in a center wall 36 of the housings 12, 14. A second end of the heater core 34 is disposed adjacent an outer wall of the first housing 12 and the second housing 14. The center wall 36 is formed to substantially extend from the first housing 12 to the second housing 14. It is understood that the center wall 36 can be formed integrally with other structures of the mixing and conditioning section 20, or can be formed separately and mounted in the mixing and conditioning section 20. The center wall 36 divides the air flow conduit 16 into a first flow path referred to as a hot air flow path 38 provided with the heater core 34 and a second flow path referred to as a cold air flow path 40. In the embodiment shown, the evaporator core 32 extends over the entire width and height of the air flow conduit 16, and the heater core 34 extends across the entire hot air flow path 38. A filter (not shown) can be provided upstream of the evaporator core 32, if desired.

The mixing and conditioning section 20 includes a blend door 41 disposed therein. The blend door 41 is adapted to selectively open and close the hot air flow path 38 and the cold air flow path 40. Any conventional blend door type can be used as desired. In the embodiment shown, the blend door 41 includes a shaft 42, on which the blend door 41 is pivotable. A first end of the shaft 42 is received in an aperture (not shown) formed in the first housing 12 and a second end of the shaft 42 is received in an aperture (not shown) formed in the second housing 14.

The shaft 42 is operatively connected to a first actuator mechanism 43 shown in FIG. 1 such as an electrical positioning motor, for example, for controlling a position of the blend door 41. It is understood that the actuator mechanism 43 can be electrically operated, mechanically operated, or fluid operated, for example. It is also understood that the blend door 41 can be directly connected to the actuator mechanism 43. In this case, the shaft 42 would not be necessary and could be removed from the blend door 41.

As illustrated in FIGS. 1 thru 5B, the blend door 41 is substantially V-shaped in cross-section. It is understood that other shapes and types of blend doors 41 can be used as desired. A first sealing surface 44 and a second sealing surface 45 are formed on the blend door 41 at an angle of substantially 90 degrees with respect to one another. However, the sealing surfaces 44, 45 can be disposed at other angles relative to one another, as desired.

A cross-member 46 extends from the first sealing surface 44 to the second sealing surface 45. The cross-member 46 is affixed to an end of each of the sealing surfaces 44, 46 at a predetermined distance D. It is understood that the predetermined distance can vary as desired without departing from the scope or spirit of the invention. Although the cross-member 46 includes a substantially constant radius R, it is understood that the cross-member can also be linear if desired.

In the embodiment shown, the mixing and conditioning section 20 of the housings 12, 14 includes a first housing wall 48 and a second housing wall 50. It is understood that the housing walls 48, 50 can be formed integrally with other structures of the mixing and conditioning section 20, or can be formed separately and mounted in the mixing and conditioning section 20.

The sealing surfaces 44, 45 are formed wherein at a first end stop position as shown in FIGS. 2A, 2B, 3A, and 3B the first sealing surface 44 is caused to abut the center wall 36 and the second sealing surface 45 is caused to abut the second housing wall 50, substantially closing the cold air flow path 40. At a second end stop position indicated by the dashed lines in FIGS. 2A, 2B, 3A, and 3B the first sealing surface 44 is caused to abut the first housing wall 48 and the second sealing surface 45 is caused to abut the center wall 36, substantially closing the hot air flow path 38. Thus, at respective end stop positions of the blend door 41, the cold air flow path 40 and the hot air flow path 38 are substantially closed to permit only hot air or cold air to flow from the evaporator core 32 into the outlet and distribution section 22 of the first housing 12 and the second housing 14.

As illustrated in FIGS. 4A, 4B, 5A, and 5B, when the blend door 41 is not at the end stop positions, the hot air flow path and the cold air flow path are partially open to permit a blend of hot air and cold air to flow from the evaporator core 32 into the outlet and distribution section 22 of the first housing 12 and the second housing 14. Hence, a gap G is formed between the blend door 41 and the center wall 36, forming a third flow path referred to as a secondary cold air flow path 52. The secondary cold air flow path 52 provides fluid communication between the hot air flow path 38 and the cold air flow path 40 downstream of the heater core 34 and upstream of the outlet and distribution section 22.

In the embodiment shown, the outlet and distribution section 22 of the first housing 12 includes a first outlet 60 and a second outlet 62. The first outlet 60 and the second outlet 62 supply conditioned air from the hot air flow path 38, the cold air flow path 40, the secondary cold air flow path 52, or a combination thereof to the passenger compartment. Although the first outlet 60 is adapted to supply conditioned air to at least one floor delivery conduit (not shown) of a driver side of the rear seat area of the passenger compartment, and the second outlet 62 is adapted to supply conditioned air to at least one headliner delivery conduit (not shown) of a driver side of the rear seat area of the passenger compartment, it is understood that the outlets 60, 62 can be adapted to supply conditioned air to other areas of the vehicle as desired. It is also understood that the outlet and distribution section 22 of the first housing 12 may include other outlets (not shown) as desired.

In a narrowing region 64 of the outlet and distribution section 22 of the first housing 12, a mode door 66 is rotatably disposed therein. The mode door 66 is adapted to selectively open and close the first outlet 60 and the second outlet 62. Any conventional mode door type can be used as desired.

In the embodiment shown, the mode door 66 includes a shaft 68, on which the mode door 66 is pivotable. A first end of the shaft 68 is received in an aperture (not shown) formed in the first housing 12. A second end of the shaft 68 is received in an aperture (not shown) of the divider 17. The shaft 68 is operatively connected to a second actuator mechanism 69 shown in FIG. 1 such as an electrical positioning motor, for example, for controlling a position of the mode door 66. It is understood that the actuator mechanism 69 can be electrically operated, mechanically operated, or fluid operated, for example. It is also understood that the mode door 66 can be directly connected to the actuator mechanism 69. In this case, the shaft 68 would not be necessary and could be removed from the mode door 66.

As illustrated in FIGS. 1, 2A, 3A, 4A, and 5A, the mode door 66 is substantially V-shaped in cross-section. It is understood that other shapes and types of mode doors 66 can be used as desired. A first sealing surface 70 and a second sealing surface 71 are formed on the mode door 66 at an angle of substantially 90 degrees with respect to one another. However, the sealing surfaces 70, 71 can be disposed at other angles relative to one another, as desired.

A cross-member 72 extends from the first sealing surface 70 to the second sealing surface 71. The cross-member 72 is affixed to an end of each of the sealing surfaces 70, 71 at a predetermined distance D1. It is understood that the predetermined distance can vary as desired without departing from the scope or spirit of the invention. Although the cross-member 72 includes a substantially constant radius R1, it is understood that the cross-member 72 can also be linear if desired.

The outlet and distribution section 22 of the first housing 12 includes a first housing wall 74, a second housing wall 76, and a third housing wall 78. It is understood that the housing walls 74, 76, 78 can be formed integrally with other structures of the outlet and distribution section 22, or can be formed separately and mounted in the outlet and distribution section 22.

Figures 2A, 2B:
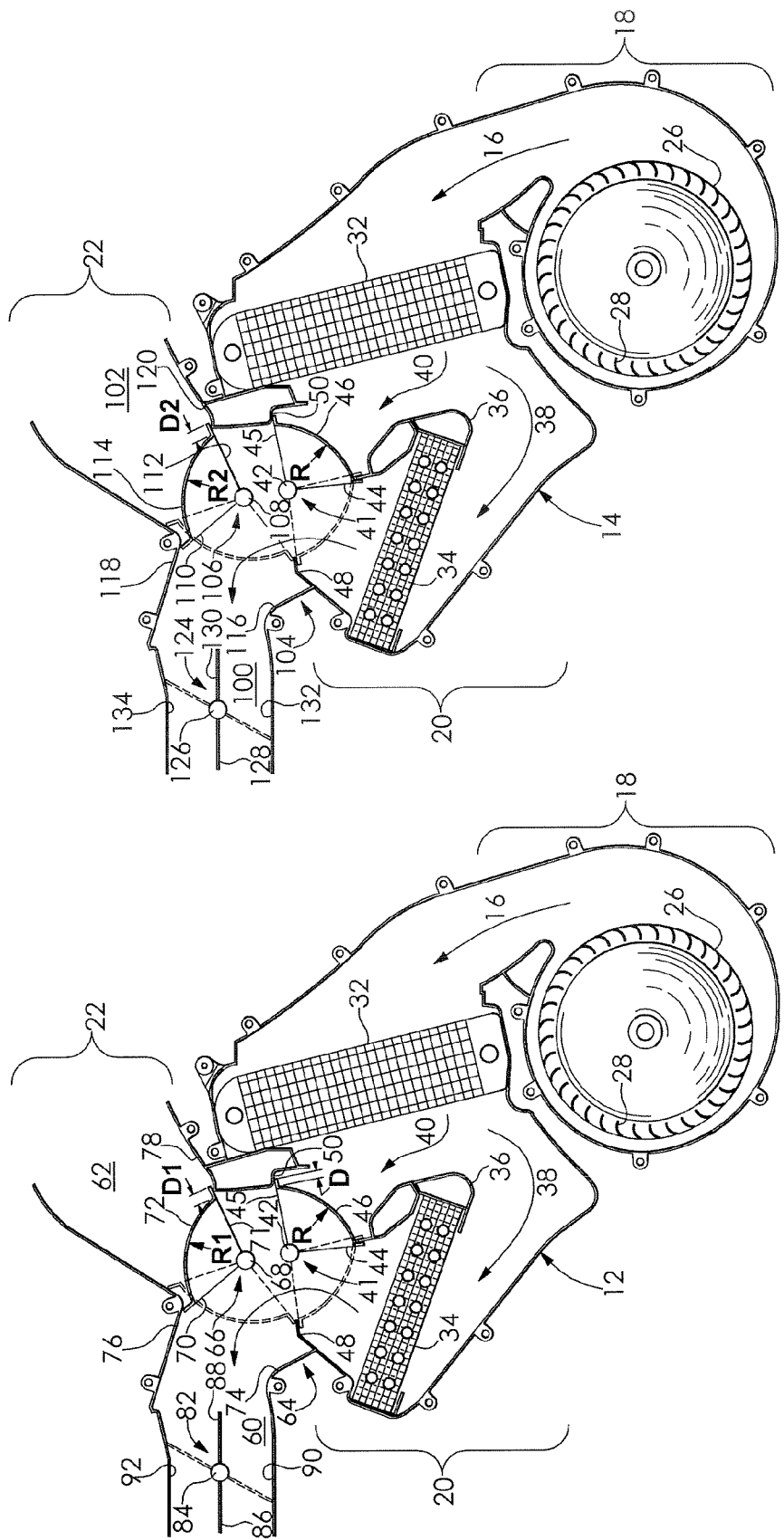
FIG. 2A is a schematic plan view of a first housing of the control module illustrated in FIG. 1 showing each of a blend door, a mode door, and an air flow volume door in a first position and a second position indicated by dashed lines.
FIG. 2B is a schematic plan view of a second housing of the module illustrated in FIG. 1 showing each of the blend door, a mode door, and an air flow volume door in a first position and a second position indicated by dashed lines.
Figure 3B:
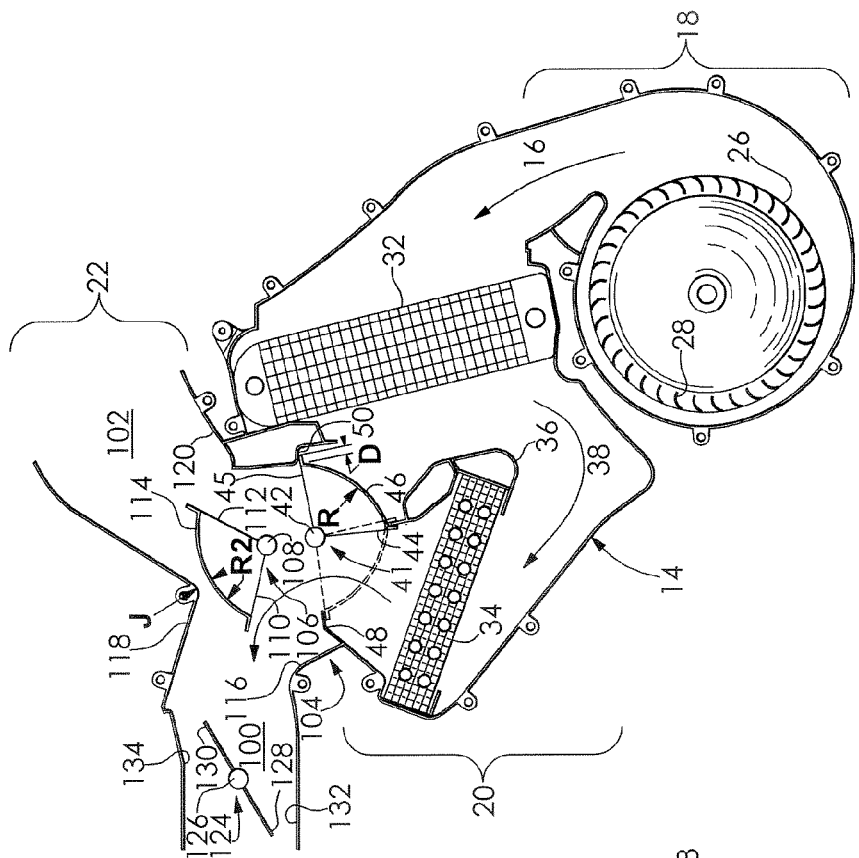
FIG. 3B is a schematic plan view of the second housing of the module illustrated in FIG. 1 showing each of the mode door and the air flow volume door in an intermediate position.
Figure 3A:
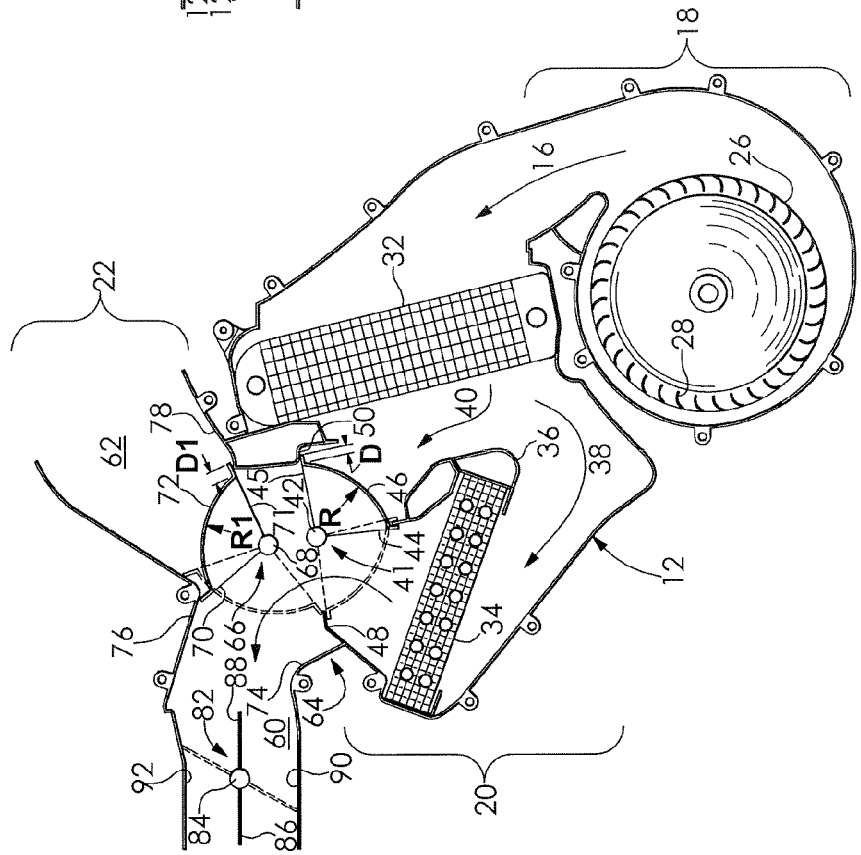
FIG. 3A is a schematic plan view of the first housing of the control module illustrated in FIG. 1 showing each of the blend door, the mode door, and the air flow volume door in the first position and the second position indicated by dashed lines.

The sealing surfaces 70, 71 are formed wherein at a first end stop position as shown in FIGS. 2A and 3A, the first sealing surface 70 is caused to abut the second housing wall 76 and the second sealing surface 71 is caused to abut the third housing wall 78, substantially closing the second outlet 62. At a second end stop position indicated by the dashed lines, the first sealing surface 70 is caused to abut the first housing wall 74 and the second sealing surface 71 is caused to abut the second housing wall 76, substantially closing the first outlet 60. Thus, at the end stop positions of the mode door 66, one of the first outlet 60 and the second outlet 62 is substantially closed to permit conditioned air to flow from the mixing and conditioning section 20 into one of the first outlet 60 and the second outlet 62, respectively.

As illustrated in FIGS. 4A and 5A, when the mode door 66 is not at the end stop positions, the first outlet 60 and the second outlet 62 are partially open to permit conditioned air to flow from the mixing and conditioning section 20 into the first outlet 60 and the second outlet 62. A clearance gap H is formed between the mode door 66 and the second housing wall 76.

In the first outlet 60 of the outlet and distribution section 22 of the first housing 12, an air flow volume door 82 is rotatably disposed therein. The air flow volume door 82 is adapted to selectively open and close the first outlet 60. It is understood that the air flow volume door 82 can be disposed in the second outlet 62 if desired. Any conventional air flow volume door type can be used as desired.

In the embodiment shown, the air flow volume door 82 includes a shaft 84, on which the air flow volume door 82 is pivotable. A first end of the shaft 84 is received in an aperture (not shown) of the first housing 12. A second end of the shaft 84 is received in an aperture (not shown) of the divider 17. The shaft 84 is operatively connected to a third actuator mechanism 85 shown in FIG. 1 such as an electrical positioning motor, for example, for controlling a position of the air flow volume door 82. It is understood that the actuator mechanism 85 can be electrically operated, mechanically operated, or fluid operated, for example. It is also understood that the air flow volume door 82 can be directly connected to the actuator mechanism 85. In this case, the shaft 84 would not be necessary and could be removed from the air flow volume door 82.

As illustrated in FIGS. 1, 2A, 3A, 4A, and 5A, the air flow volume door 82 is a butterfly-type flapper door. It is understood that other shapes and types of air flow volume doors 82 can be used as desired. A first sealing surface 86 and a second sealing surface 88 are formed on the air flow volume door 82 at an angle of substantially 180 degrees with respect to one another. It is understood that the sealing surfaces 86, 88 can be disposed at other angles relative to one another, as desired.

The first outlet 60 of the first housing 12 also includes a first housing wall 90 and a second housing wall 92. It is understood that the housing walls 90, 92 can be formed integrally with other structures of the first outlet 60, or can be formed separately and mounted in the first outlet 60.

At a first position as shown in FIGS. 2A and 3A, the air flow volume door 82 is substantially open to permit a volume of conditioned air to flow through the first outlet 60. At an end stop position indicated by the dashed lines, the first sealing surface 86 is caused to abut the first housing wall 90 and the second sealing surface 88 is caused to abut the second housing wall 92, substantially closing the first outlet 60. Thus, a volume of conditioned air flows from the mixing and conditioning section 20 into only the second outlet 62. As illustrated in FIGS. 4A and 5A, when the air flow volume door 82 is not at the end stop position, the first outlet 60 is partially open to permit a volume of conditioned air less than the volume of conditioned air permitted to flow in the first position to flow therethrough.

As illustrated in FIGS. 2B, 3B, 4B, and 5B the outlet and distribution section 22 of the second housing 14 includes a first outlet 100 and a second outlet 102. The first outlet 100 and the second outlet 102 supply conditioned air from the hot air flow path 38, the cold air flow path 40, the secondary cold air flow path 52, or a combination thereof to the passenger compartment. Although the first outlet 100 is adapted to supply conditioned air to at least one floor delivery conduit (not shown) of a passenger side of the rear seat area of the passenger compartment, and the second outlet 102 is adapted to supply conditioned air to at least one headliner delivery conduit (not shown) of a passenger side of the rear seat area of the passenger compartment, it is understood that the outlets 100, 102 can be adapted to supply conditioned air to other areas of the vehicle as desired. It is also understood that the outlet and distribution section 22 of the second housing 14 may include other outlets (not shown) as desired.

In a narrowing region 104 of the outlet and distribution section 22 of the second housing 14, a mode door 106 is rotatably disposed therein. The mode door 106 is adapted to selectively open and close the first outlet 100 and the second outlet 102. Any conventional mode door type can be used as desired.

In the embodiment shown, the mode door 106 includes a shaft 108, on which the mode door 106 is pivotable. A first end of the shaft 108 is received in an aperture (not shown) formed in the second housing 14. A second end of the shaft 108 is received in an aperture (not shown) of the divider 17. The shaft 108 is operatively connected to a fourth actuator mechanism 109 shown in FIG. 1 such as an electrical positioning motor, for example, for controlling a position of the mode door 106. It is understood that the actuator mechanism 109 can be electrically operated, mechanically operated, or fluid operated, for example. It is also understood that the mode door 106 can be directly connected to the actuator mechanism 109. In this case, the shaft 108 would not be necessary and could be removed from the mode door 106.

As illustrated in FIGS. 1, 2B, 3B, 4B, and 5B, the mode door 106 is substantially V-shaped in cross-section. It is understood that other shapes and types of mode doors 106 can be used as desired. A first sealing surface 110 and a second sealing surface 112 are formed on the mode door 106 at an angle of substantially 90 degrees with respect to one another.

However, the sealing surfaces 110, 112 can be disposed at other angles relative to one another, as desired.

A cross-member 114 extends from the first sealing surface 110 to the second sealing surface 112. The cross-member 114 is affixed to an end of each of the sealing surfaces 110, 112 at a predetermined distance D2. It is understood that the predetermined distance can vary as desired without departing from the scope or spirit of the invention. Although the cross-member 114 includes a substantially constant radius R2, it is understood that the cross-member 114 can also be linear if desired.

The outlet and distribution section 22 of the second housing 14 includes a first housing wall 116, a second housing wall 118, and a third housing wall 120. It is understood that the housing walls 116, 118, 120 can be formed integrally with other structures of the outlet and distribution section 22, or can be formed separately and mounted in the outlet and distribution section 22.

The sealing surfaces 110, 112 are formed wherein at a first end stop position as shown in FIGS. 2B and 4B, the first sealing surface 110 is caused to abut the second housing wall 118 and the second sealing surface 112 is caused to abut the third housing wall 120, substantially closing the second outlet 102. At a second end stop position indicated by the dashed lines, the first sealing surface 110 is caused to abut the first housing wall 116 and the second sealing surface 112 is caused to abut the second housing wall 118, substantially closing the first outlet 100. Thus, at the end stop positions of the mode door 106, one of the first outlet 100 and the second outlet 102 is substantially closed to permit conditioned air to flow from the mixing and conditioning section 20 into one of the first outlet 100 and the second outlet 102, respectively.

As illustrated in FIGS. 3B and 5B, when the mode door 106 is not at the end stop positions, the first outlet 100 and the second outlet 102 are partially open to permit conditioned air to flow from the mixing and conditioning section 20 into the first outlet 100 and the second outlet 102. A clearance gap J is formed between the mode door 106 and the second housing wall 118.

In the first outlet 100 of the outlet and distribution section 22 of the second housing 14, an air flow volume door 124 is rotatably disposed therein. The air flow volume door 124 is adapted to selectively open and close the first outlet 100. It is understood that the air flow volume door 124 can be disposed in the second outlet 102 of the outlet and distribution section 22 of the second housing 14 if desired. Any conventional air flow volume door type can be used as desired.

In the embodiment shown, the air flow volume door 124 includes a shaft 126, on which the air flow volume door 124 is pivotable. A first end of the shaft 126 is received in an aperture (not shown) of the second housing 14. A second end of the shaft 126 is received in an aperture (not shown) of the divider 17. The shaft 126 is operatively connected to a fifth actuator mechanism 127 shown in FIG. 1 such as an electrical positioning motor, for example, for controlling a position of the air flow volume door 124. It is understood that the actuator mechanism 127 can be electrically operated, mechanically operated, or fluid operated, for example. It is also understood that the air flow volume door 124 can be directly connected to the actuator mechanism 127. In this case, the shaft 126 would not be necessary and could be removed from the air flow volume door 124.

As illustrated in FIGS. 1, 2B, 3B, 4B, and 5B, the air flow volume door 124 is a butterfly-type flapper door. It is understood that other shapes and types of air flow volume doors 124 can be used as desired. A first sealing surface 128 and a second sealing surface 130 are formed on the air flow volume door 124 at an angle of substantially 180 degrees with respect to one another. It is understood that the sealing surfaces 128, 130 can be disposed at other angles relative to one another, as desired.

The first outlet 100 of the second housing 14 also includes a first housing wall 132 and a second housing wall 134. It is understood that the housing walls 132, 134 can be formed integrally with other structures of the first outlet 100, or can be formed separately and mounted in the first outlet 100.

At a first position as shown in FIGS. 2B and 4B, the air flow volume door 124 is substantially open to permit a volume of conditioned air to flow through the first outlet 100. At an end stop position indicated by the dashed lines, the first sealing surface 128 is caused to abut the first housing wall 132 and the second sealing surface 130 is caused to abut the second housing wall 134, substantially closing the first outlet 100. Thus, a volume of conditioned air flows from the mixing and conditioning section 20 into only the second outlet 102. As illustrated in FIGS. 3B and 5B, when the air flow volume door 124 is not at the end stop position, the first outlet 100 is partially open to permit a volume of conditioned air less than the volume of conditioned air permitted to flow in the first position to flow therethrough.

The divider 17 is typically disposed between the first housing 12 and the second housing 14. The divider 17 is adapted to separate conditioned air flowing through the outlet and distribution section 22 of the first housing 12 and the second housing 14. In the embodiment shown, the conditioned air is delivered from the module 10 to a driver side and a passenger side of the passenger compartment of the vehicle as desired. It is understood that the divider 17 can also be disposed between the mixing and conditioning section 20 of the first housing 12 and the second housing 14 to separate the conditioned air exiting the evaporator core 32 and the heater core 34 facilitating independent control of a temperature of conditioned air delivered to the separate areas of the passenger compartment of the vehicle. Additional doors and dividers may be disposed in the first housing 12 and the second housing 14 to control a blend, a mode, and a volume of conditioned air delivered to other areas of the vehicle as desired.

Since operation of the first housing 12 and the second housing 14 is substantially similar, for simplicity, only the operation of the first housing 12 will be described hereinafter.

In operation, the module 10 conditions air by heating or cooling the air, and providing the conditioned air to the passenger compartment of the vehicle. Air flows through the module 10 through both the first housing 12 and the second housing 14. Air from the supply of air is received in the module 10 through the air inlet 24 by the blower wheel 26. During rotation of the blower wheel 26, the blades 28 of the blower wheel 26 cause the air to flow radially outwardly and into the air flow conduit 16 of the inlet section 18. The rate of air flow through the air flow conduit 16 is controlled by the motor 27 selectively increasing and decreasing the rotational motion of the blower wheel 26.

The air then flows to the evaporator core 32 where the air is cooled to a desired temperature and dehumidified by transfer of heat from the air to the cooled fluid circulated through the evaporator core 32. The conditioned cooled air stream then exits the evaporator core 32. The blend door 41 is positioned as desired to cause the air to flow through the heater core 34, bypass the heater core 34, or some combination thereof.

As shown in FIGS. 2A and 3A, the blend door 41 in the first position sealingly closes the cold air flow path 40 to militate against flow of air therethrough. Air is caused to flow through the heater core 34 and into the outlet and distribution section 22 of the first housing 12 and the second housing 14. When the blend door 41 is rotated from the first position to the second position indicated by the dashed lines, sealingly closing the hot air flow path 38, the blend door 41 causes the air to bypass the heat core 34. Air is permitted to flow through the cold air flow path 40 and into the outlet and distribution sections 22. If it is desired to cause the air to flow through the heater core 34 and to bypass the heater core 34, the blend door 41 is positioned intermediate the first position and the second position as shown in FIGS. 4A and 5A. Therefore, a portion of the air will be directed through the heater core 34 and a portion of the air will bypass the heater core 34.

In the heater core 34, the air is heated by transfer of heat from the heated fluid circulated through the heater core 34. A temperature of the conditioned air stream downstream of the blend door 41 can be maintained as desired between a maximum temperature equal to the temperature of the hot air exiting the heater core 34 with the blend door 41 in the first position and a minimum temperature equal to the temperature of the air exiting the evaporator core 32 with the blend door 41 in the second position. If a desired temperature between the maximum temperature and the minimum temperature is desired, the blend door 41 is positioned intermediate the first position and the second position until the desired temperature is reached. The intermediate position is then maintained to maintain the desired temperature.

The conditioned air is then caused to exit the module 10 through the outlet and distribution section 22 for delivery to and distribution in the passenger compartment of the vehicle. The mode door 66 and the air flow volume door 82 of the first housing 12 are positioned as desired to selectively distribute the air to the first outlet 60, the second outlet 62, or some combination thereof.

As shown in FIGS. 2A and 3A, the mode door 66 is in the first position to sealingly close the second outlet 62, and militate against the flow of air therethrough. The air flow volume door 82 is in the first position to permit the flow of air through the first outlet 60. Air is caused to flow through the first outlet 60 and into the delivery conduit supplying the passenger compartment of the vehicle. When the mode door 66 is rotated from the first position to the second position indicated by the dashed lines, sealingly closing the first outlet 60 the mode door 66 militates against the flow of air through the first outlet 60. Air is caused to flow through the second outlet 62 and into the delivery conduit supplying the passenger compartment of the vehicle.

If it is desired to cause the air to flow through the first outlet 60 and the second outlet 62, the mode door 66 is positioned intermediate the first position and the second position as shown in FIGS. 3A and 4A. In the embodiment shown, the mode door 66 allows for separate control between a headliner area and a floor area of the driver side of the rear seat portion of the passenger compartment of the vehicle by controlling the flow through the outlets 60, 62.

When the mode door 66 is in the first position as shown in FIGS. 2A and 3A, or intermediate the first position and the second position as shown in FIGS. 4A and 5A, the air flow volume door 82 is positioned as desired to selectively control a volume of air flowing through the first outlet 60. To selectively control the volume of air flow through the second outlet 62, the air flow volume door 82 and the mode door 66 are positioned as desired.

Accordingly, when the blend door 41, the mode doors 66, 106, and the volume doors 82, 124 are selectively positioned and the motor 27 selectively increases or decreases the rate of rotation of the blower wheel 26, a desired temperature and volume of air flow is provided to the first outlet 60 and the second outlet 62.

In the embodiment shown in FIGS. 2A and 2B, a temperature and a volume of air flow to the floor area of the driver side and the passenger side of the passenger compartment are maximized with the blend door 41, the mode doors 66, 106, and the air flow volume doors 82, 124 in the first position and minimized with the blend door 41, the mode doors 66, 106, and the air flow volume doors 82, 124 in the second position indicated by the dashed lines.

In the embodiment shown in FIGS. 3A and 3B, the temperature and the volume of air flow to the floor area of the driver side of the passenger compartment are maximized with the blend door 41, the mode door 66, and the air flow volume door 82 in the first position and minimized with the blend door 41, the mode door 66, and the air flow volume door 82 in the second position indicated by the dashed lines. The temperature of air flow to the floor and headliner areas of the passenger side is maximized with the blend door 41 in the first position and minimized with the blend door 41 in the second position indicated by the dashed lines. The volume of air flow to the floor and headliner areas of the passenger side is between a maximum level and a minimum level with the mode door 106 and the air flow volume door 124 in the intermediate position.

In the embodiment shown in FIGS. 4A and 4B, the temperature and volume of air flow to the floor and headliner areas of the driver side are between a maximum level and a minimum level with the blend door 41, the mode door 66, and the air flow volume door 82 in the intermediate position. The temperature of air flow to the floor and headliner areas of the passenger side is between a maximum level and a minimum level with the blend door 41 in the intermediate position. The volume of air flow to the floor area of the passenger side is maximized with the mode door 106 and the air flow volume door 124 in the first position and minimized with the mode door 106 and the air flow volume door 124 in the second position indicated by the dashed lines.

In the embodiment shown in FIGS. 5A and 5B, the temperature and volume of air flow to the floor and headliner areas of the driver side and the passenger side are between a maximum level and a minimum level with the blend door 41, the mode doors 66, 106 and the air flow volume doors 82, 124 in the intermediate position.

FIGS. 6 thru 10B show another embodiment of the invention which includes a module similar to that shown in FIGS. 1 thru 5B. Reference numerals for similar structure in respect of the description of FIGS. 1 thru 5B are repeated in FIGS. 6 thru 10B with a prime (') symbol.

FIG. 6 shows a module 10'. The module 10' typically provides heating, ventilation, and air conditioning for a plurality of passenger zones (not shown) in a passenger compartment of a vehicle (not shown). Each of the passenger zones includes at least one air flow area such as a headliner area, a floor area, and a defrost area. In the embodiment shown, the module 10' includes independent air flow temperature control for each passenger zone. Although the embodiment shown and described herein is a rear dual-zone air-handling system, it is understood that the invention can be used with other types of air-handling systems disposed in the vehicle as desired, such as a lateral or "handed", a center mount and a semi-center mount, for example. It is also understood that the invention applies to other multi-zone systems such as a tri-zone system and a quad-zone system, for example.

The module 10' includes a first housing 12' and a second housing 14', substantially the same as the first housing 12' and adapted to be joined therewith. In the embodiment shown, the first housing 12' and the second housing 14' are produced from plastic and are joined with each other. It is understood that the first housing 12' and the second housing 14' can be formed from other materials as desired. The first housing 12' and the second housing 14' cooperate to form a hollow main housing assembly with an air flow conduit 16', as shown in FIGS. 7A thru 10B formed therein. A divider 17' is typically disposed between the first housing 12' and the second housing 14' to form a first sub-passage and a second sub-passage and separate a flow of air therethrough.

As illustrated in FIGS. 7A thru 10B the first housing 12' and the second housing 14' include an inlet section 18', a mixing and conditioning section 20', and an outlet and distribution section 22'. The inlet section 18', the mixing and conditioning section 20', and the outlet and distribution section 22' of the first housing 12' are adapted to abut the inlet section 18', the mixing and conditioning section 20', and the outlet and distribution section 22', respectively, of the second housing 14'. In the embodiment shown, an air inlet 24' is formed in the inlet section 18' of at least one of the first housing 12' and the second housing 14'. The air inlet 24' is in fluid communication with a supply of air (not shown). A filter (not shown) can be provided upstream or downstream of the inlet section 18' if desired. The supply of air can be provided from outside of the vehicle, recirculated from the passenger compartment of the vehicle, or a mixture of the two, for example.

The inlet section 18' is adapted to receive a blower wheel 26' therein. A motor 27' is coupled to the blower wheel 26' to impart rotational motion to the blower wheel 26'. Any conventional motor type can be employed such as an electrically powered motor, for example. The blower wheel 26' includes a plurality of blades 28' disposed thereon. The blades 28' cause air to be drawn through the air inlet 24'. The air is expelled radially outwardly from the blower wheel 26' during the rotational motion thereof. The motor 27' is adapted to selectively increase and decrease the rotational motion of the blower wheel 26', thereby controlling a rate of air flow through the air flow conduit 16'.

The mixing and conditioning section 20' is adapted to receive an evaporator core 32' and a heater core 34' therein. The evaporator core 32' and the heater core 34' are in communication with a source of cooled fluid (not shown) and a source of heated fluid (not shown), respectively. A first end of the heater core 34' is disposed in a center wall 36' of the first housing 12' and the second housing 14'. A second end of the heater core 34' is disposed adjacent an outer wall of the housings 12', 14'. The center wall 36' is formed to substantially extend from the first housing 121 to the second housing 14'. It is understood that the center wall 36' can be formed integrally with other structures of the mixing and conditioning section 20', or can be formed separately and mounted in the mixing and conditioning section 20'. The center wall 36' divides the air flow conduit 16' into a first flow path referred to as a hot air flow path 38' provided with the heater core 34' and a second flow path referred to as a cold air flow path 40'. In the embodiment shown, the evaporator core 32' extends over the entire width and height of the air flow conduit 16', and the heater core 34' extends across the entire hot air flow path 38'. A filter (not shown) can be provided upstream of the evaporator core 32', if desired.

The mixing and conditioning section 20' of the first housing 12' includes a blend door 41' disposed therein. The blend door 41' is adapted to selectively open and close the hot air flow path 38' and the cold air flow path 40'. Any conventional blend door type can be used as desired. In the embodiment shown, the blend door 41' includes a shaft 42', on which the blend door 41' is pivotable. A first end of the shaft 421 is received in an aperture (not shown) formed in the first housing 12' and a second end of the shaft 42' is received in an aperture (not shown) formed in the divider 17'.

The shaft 42' is operatively connected to a first actuator mechanism 43' such as an electrical positioning motor, for example, for controlling a position of the blend door 41'. It is understood that the actuator mechanism 43' can be electrically operated, mechanically operated, or fluid operated, for example. It is also understood that the blend door 41' can be directly connected to the actuator mechanism 43'. In this case, the shaft 421 would not be necessary and could be removed from the blend door 41'.

As illustrated in FIGS. 6, 7A, 8A, 9A, and 10A, the blend door 41' is substantially V-shaped in cross-section. It is understood that other shapes and types of blend doors 41' can be used as desired. A first sealing surface 44' and a second sealing surface 45' are formed on the blend door 41' at an angle of substantially 90 degrees with respect to one another. However, the sealing surfaces 44', 45' can be disposed at other angles relative to one another, as desired.

A cross-member 46' extends from the first sealing surface 44' to the second sealing surface 45'. The cross-member 46' is affixed to an end of each of the sealing surfaces 44', 46' at a predetermined distance D'. It is understood that the predetermined distance can vary as desired without departing from the scope or spirit of the invention. Although the cross-member 46' includes a substantially constant radius R', it is understood that the cross-member can also be linear if desired.

In the embodiment shown, the mixing and conditioning section 20' of the first housing 12' includes a first housing wall 48' and a second housing wall 50'. It is understood that the housing walls 48', 50' can be formed integrally with other structures of the mixing and conditioning section 20', or can be formed separately and mounted in the mixing and conditioning section 20'.

Figure 7B:
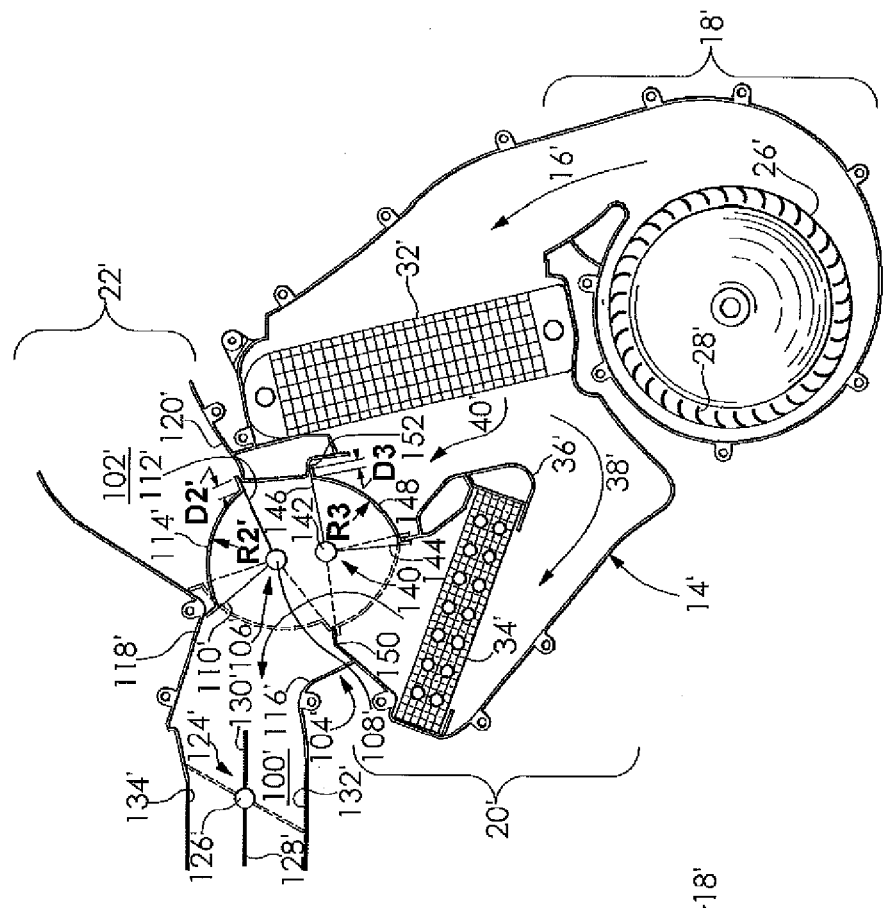
FIG. 7B is a schematic plan view of a second housing of the module illustrated in FIG. 6 showing each of a blend door, a mode door and an air flow volume door in a first position and a second position indicated by dashed lines.
Figure 7A:
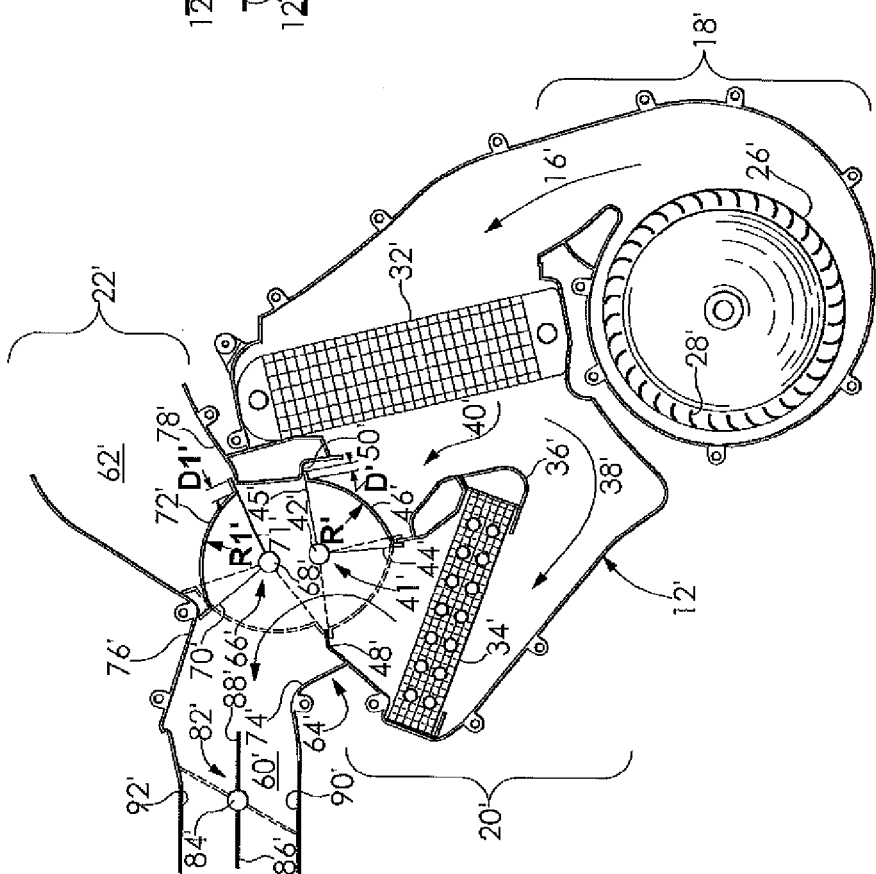
FIG. 7A is a schematic plan view of a first housing of the control module illustrated in FIG. 6 showing each of a blend door, a mode door, and an air flow volume door in a first position and a second position indicated by dashed lines.
Figure 8B:
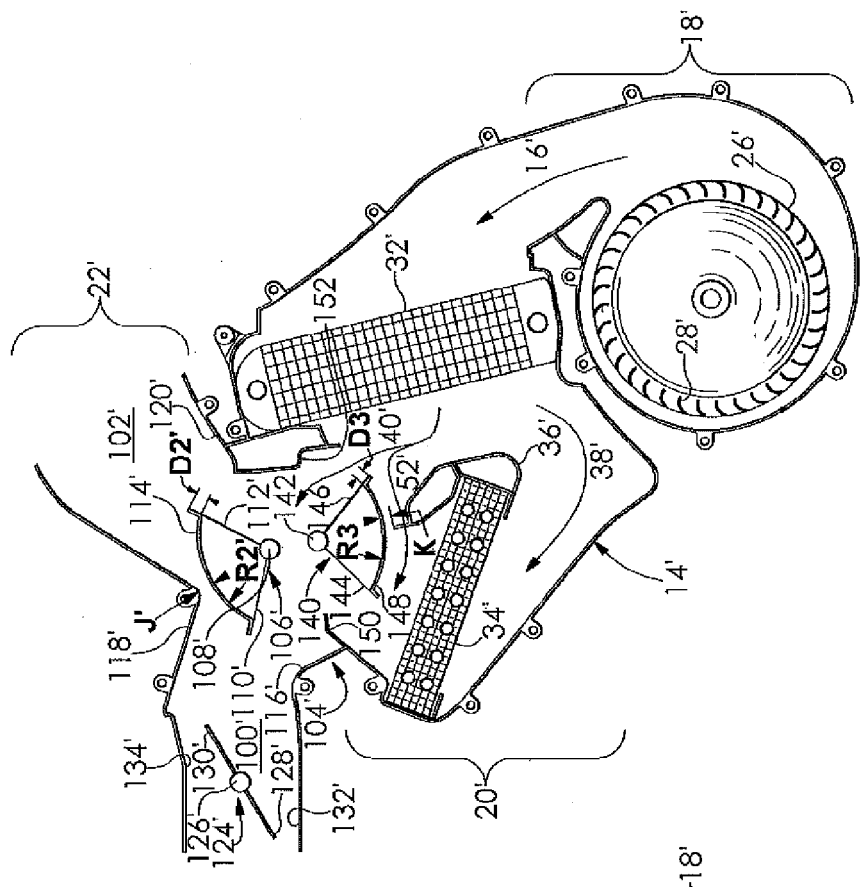
FIG. 8B is a schematic plan view of the second housing of the module illustrated in FIG. 6 showing each of the blend door, the mode door, and the air flow volume door in an intermediate position.
Figure 8A:
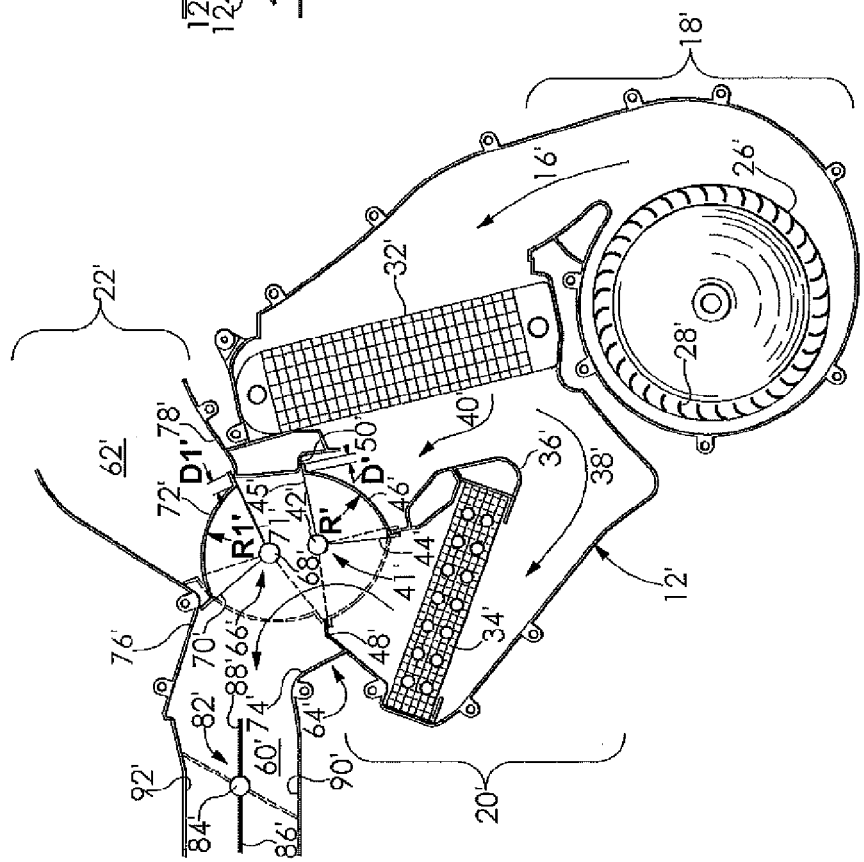
FIG. 8A is a schematic plan view of the first housing of the control module illustrated in FIG. 6 showing each of the blend door, the mode door, and the air flow volume door in the first position and the second position indicated by dashed lines.

The sealing surfaces 44', 45' are formed wherein at a first end stop position as shown in FIGS. 7A and 8A, the first sealing surface 44' is caused to abut the center wall 36' and the second sealing surface 45' is caused to abut the second housing wall 50', substantially closing the cold air flow path 40'. At a second end stop position indicated by the dashed lines in FIGS. 7A and 8A, the first sealing surface 44' is caused to abut the first housing wall 48' and the second sealing surface 45' is caused to abut the center wall 36', substantially closing the hot air flow path 38'. Thus, at respective end stop positions of the blend door 41', the cold air flow path 40' and the hot air flow path 38' are substantially closed to permit only hot air or cold air to flow from the evaporator core 32' into the outlet and distribution section 22' of the first housing 12'.

Figure 9B:
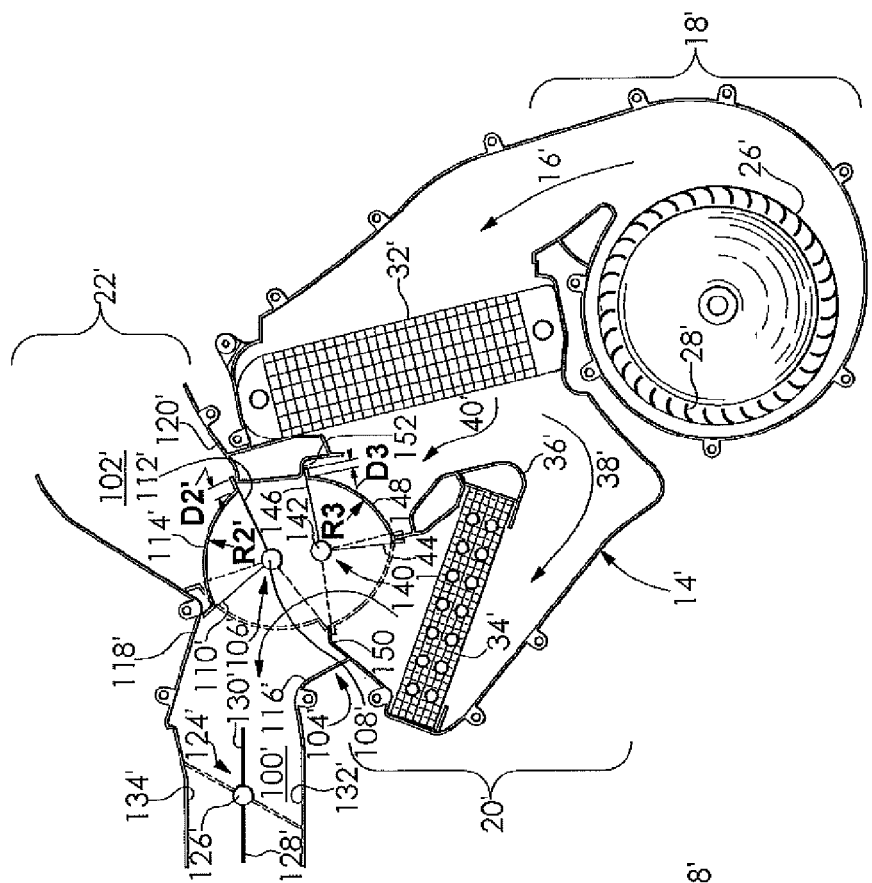
FIG. 9B is a schematic plan view of the second housing of the module illustrated in FIG. 6 showing each of the blend door, the mode door, and the air flow volume door in the first position and the second position indicated by dashed lines.
Figure 9A:
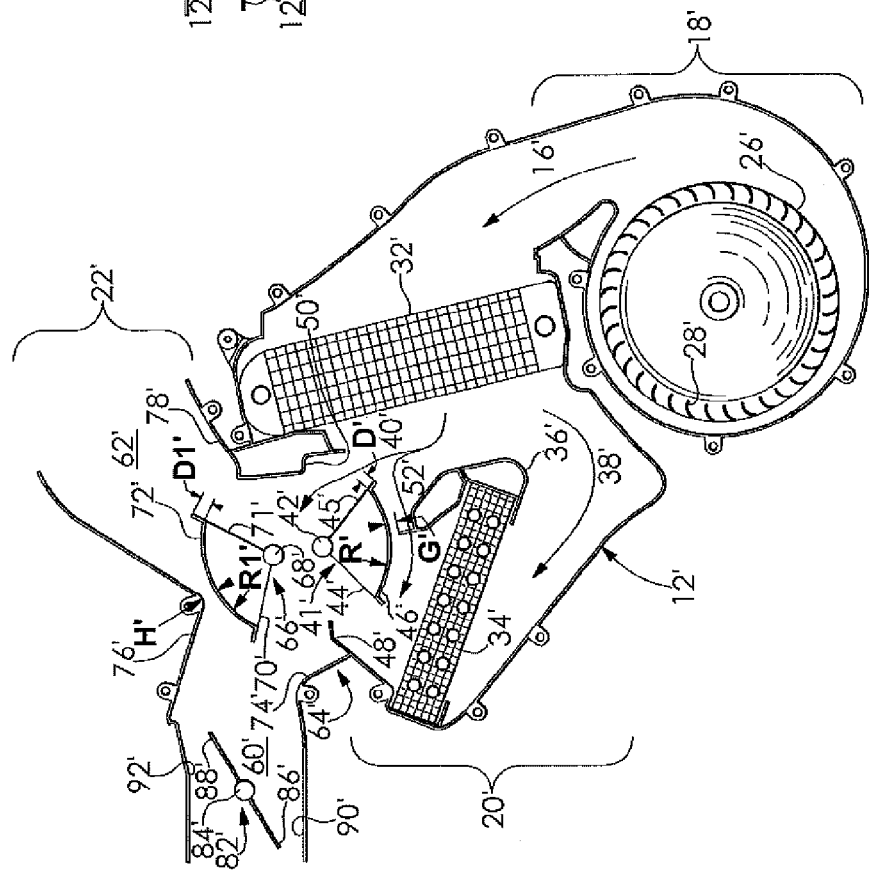
FIG. 9A is a schematic plan view of the first housing of the module illustrated in FIG. 6 showing each of the blend door, the mode door, and the air flow volume door in an intermediate position.

As illustrated in FIGS. 9A and 10A, when the blend door 41' is not at the end stop positions, the hot air flow path and the cold air flow path are partially open to permit a blend of hot air and cold air to flow from the evaporator core 32' into the outlet and distribution section 22' of the first housing 12'. Hence, a gap G' is formed between the blend door 41' and the center wall 36', forming a third flow path referred to as a secondary cold air flow path 52'. The secondary cold air flow path 52' provides fluid communication between the hot air flow path 38' and the cold air flow path 40' downstream of the heater core 34' and upstream of the outlet and distribution section 22'.

In the embodiment shown, the outlet and distribution section 22' of the first housing 12' includes a first outlet 60' and a second outlet 62'. The first outlet 60' and the second outlet 62' supply conditioned air from the hot air flow path 38', the cold air flow path 40', the secondary cold air flow path 52', or a combination thereof to the passenger compartment. Although the first outlet 60' is adapted to supply conditioned air to at least one floor delivery conduit (not shown) of a driver side of the rear seat area of the passenger compartment, and the second outlet 62' is adapted to supply conditioned air to at least one headliner delivery conduit (not shown) of a driver side of the rear seat area of the passenger compartment, it is understood that the outlets 60', 62' can be adapted to supply conditioned air to other areas of the vehicle as desired. It is also understood that the outlet and distribution section 22' of the first housing 12' may include other outlets (not shown) as desired.

In a narrowing region 64' of the outlet and distribution section 22' of the first housing 12', a mode door 66' is rotatably disposed therein. The mode door 66' is adapted to selectively open and close the first outlet 60' and the second outlet 62'. Any conventional mode door type can be used as desired.

In the embodiment shown, the mode door 66' includes a shaft 68', on which the mode door 66' is pivotable. A first end of the shaft 68' is received in an aperture (not shown) formed in the first housing 12'. A second end of the shaft 68' is received in an aperture (not shown) of the divider 17'. The shaft 68' is operatively connected to a second actuator mechanism 69' such as an electrical positioning motor, for example, for controlling a position of the mode door 66'. It is understood that the actuator mechanism 69' can be electrically operated, mechanically operated, or fluid operated, for example. It is also understood that the mode door 66' can be directly connected to the actuator mechanism 69'. In this case, the shaft 68' would not be necessary and could be removed from the mode door 66'.

As illustrated, the mode door 66' is substantially V-shaped in cross-section. It is understood that other shapes and types of mode doors 66' can be used as desired. A first sealing surface 70' and a second sealing surface 71' are formed on the mode door 66' at an angle of substantially 90 degrees with respect to one another. However, the sealing surfaces 70', 71' can be disposed at other angles relative to one another, as desired.

A cross-member 72' extends from the first sealing surface 70' to the second sealing surface 71'. The cross-member 721 is affixed to an end of each of the sealing surfaces 70', 71' at a predetermined distance D1'. It is understood that the predetermined distance can vary as desired without departing from the scope or spirit of the invention. Although the cross-member 72' includes a substantially constant radius R1', it is understood that the cross-member 72' can also be linear if desired.

The outlet and distribution section 22' of the first housing 12' includes a first housing wall 74', a second housing wall 76', and a third housing wall 78'. It is understood that the housing walls 74', 76', 78' can be formed integrally with other structures of the outlet and distribution section 22', or can be formed separately and mounted in the outlet and distribution section 22'.

The sealing surfaces 70', 71' are formed wherein at a first end stop position as shown in FIGS. 7A and 8A, the first sealing surface 70' is caused to abut the second housing wall 76' and the second sealing surface 71' is caused to abut the third housing wall 78', substantially closing the second outlet 62'. At a second end stop position indicated by the dashed lines, the first sealing surface 70' is caused to abut the first housing wall 74' and the second sealing surface 71' is caused to abut the second housing wall 76', substantially closing the first outlet 60'. Thus, at the end stop positions of the mode door 66', one of the first outlet 60' and the second outlet 62' is substantially closed to permit conditioned air to flow from the mixing and conditioning section 20' flows into one of the first outlet 60' and the second outlet 62', respectively.

As illustrated in FIGS. 9A and 10A, when the mode door 66' is not at the end stop positions, the first outlet 60' and the second outlet 62' are partially open to permit conditioned air to flow into the first outlet 60' and the second outlet 62'. A clearance gap H' is formed between the mode door 66' and the second housing wall 76'.

In the first outlet 60' of the outlet and distribution section 22' of the first housing 12', an air flow volume door 82' is rotatably disposed therein. The air flow volume door 82' is adapted to selectively open and close the first outlet 60'. It is understood that the air flow volume door 82' can be disposed in the second outlet 62' if desired. Any conventional air flow volume door type can be used as desired.

In the embodiment shown, the air flow volume door 82' includes a shaft 84', on which the air flow volume door 82' is pivotable. A first end of the shaft 84' is received in an aperture (not shown) of the first housing 12'. A second end of the shaft 84' is received in an aperture (not shown) of the divider 17'. The shaft 84' is operatively connected to a third actuator mechanism 85' such as an electrical positioning motor, for example, for controlling a position of the air flow volume door 82'. It is understood that the actuator mechanism 85' can be electrically operated, mechanically operated, or fluid operated, for example. It is also understood that the air flow volume door 82' can be directly connected to the actuator mechanism 85'. In this case, the shaft 84' would not be necessary and could be removed from the air flow volume door 82'.

As illustrated in FIGS. 6, 7A, 8A, 9A, and 10A, the air flow volume door 82' is a butterfly-type flapper door. It is understood that other shapes and types of air flow volume doors 82' can be used as desired. A first sealing surface 86' and a second sealing surface 88' are formed on the air flow volume door 82' at an angle of substantially 180 degrees with respect to one another. It is understood that the sealing surfaces 86', 88' can be disposed at other angles relative to one another, as desired.

The first outlet 60' of the first housing 12' also includes a first housing wall 90' and a second housing wall 92'. It is understood that the housing walls 90', 92' can be formed integrally with other structures of the first outlet 60', or can be formed separately and mounted in the first outlet 60'.

At a first position as shown in FIGS. 7A and 8A, the air flow volume door 82' is substantially open to permit a volume of conditioned air to flow through the first outlet 60'. At an end stop position indicated by the dashed lines, the first sealing surface 86' is caused to abut the first housing wall 90' and the second sealing surface 88' is caused to abut the second housing wall 92', substantially closing the first outlet 60'. Thus, a volume of conditioned air flows from the mixing and conditioning section 20' into only the second outlet 62'. As illustrated in FIGS. 9A and 10A, when the air flow volume door 82' is not at the end stop position, the first outlet 60' is partially open to permit a volume of conditioned air less than the volume of conditioned air permitted to flow in the first position to flow therethrough.

As illustrated in FIGS. 6, 7B, 8B, 9B, and 10B, the mixing and conditioning section 20' of the second housing 14' includes a blend door 140 disposed therein. The blend door 140 is adapted to selectively open and close the hot air flow path 38' and the cold air flow path 40'. Any conventional blend door type can be used as desired. In the embodiment shown, the blend door 140 includes a shaft 142, on which the blend door 140 is pivotable. A first end of the shaft 142 is received in an aperture (not shown) formed in the second housing 14' and a second end of the shaft 142 is received in an aperture (not shown) formed in the divider 17'.

The shaft 142 is operatively connected to a fourth actuator mechanism 143 such as an electrical positioning motor, for example, for controlling a position of the blend door 140. It is understood that the actuator mechanism 143 can be electrically operated, mechanically operated, or fluid operated, for example. It is also understood that the blend door 140 can be directly connected to the actuator mechanism 143. In this case, the shaft 142 would not be necessary and could be removed from the blend door 140.

As illustrated, the blend door 140 is substantially V-shaped in cross-section. It is understood that other shapes and types of blend doors 140 can be used as desired. A first sealing surface 144 and a second sealing surface 146 are formed on the blend door 140 at an angle of substantially 90 degrees with respect to one another. However, the sealing surfaces 144, 146 can be disposed at other angles relative to one another, as desired.

A cross-member 148 extends from the first sealing surface 144 to the second sealing surface 146. The cross-member 148 is affixed to an end of each of the sealing surfaces 144, 146 at a predetermined distance D3. It is understood that the predetermined distance can vary as desired without departing from the scope or spirit of the invention. Although the cross-member 148 includes a substantially constant radius R3, it is understood that the cross-member can also be linear if desired.

In the embodiment shown, the mixing and conditioning section 20' of the second housing 14' includes a first housing wall 150 and a second housing wall 152. It is understood that the housing walls 150, 152 can be formed integrally with other structures of the mixing and conditioning section 20', or can be formed separately and mounted in the mixing and conditioning section 20'.

The sealing surfaces 144, 146 are formed wherein at a first end stop position as shown in FIGS. 7B and 9B, the first sealing surface 144 is caused to abut the center wall 36' and the second sealing surface 146 is caused to abut the second housing wall 152, substantially closing the cold air flow path 40'. At a second end stop position indicated by the dashed lines in FIGS. 7B and 9B, the first sealing surface 144 is caused to abut the first housing wall 150 and the second sealing surface 146 is caused to abut the center wall 36', substantially closing the hot air flow path 38'. Thus, at respective end stop positions of the blend door 140, the cold air flow path 40' and the hot air flow path 38' are substantially closed to permit only hot air or cold air to flow from the evaporator core 32' into the outlet and distribution section 22' of the second housing 14'.

As illustrated in FIGS. 8B and 10B, when the blend door 140 is not at the end stop positions, the hot air flow path and the cold air flow path are partially open to permit to permit a blend of hot air and cold air to flow from the evaporator core 32' into the outlet and distribution section 22' of the second housing 14'. Hence, a gap K is formed between the blend door 140 and the center wall 36', forming a third flow path referred to as a secondary cold air flow path 52'. The secondary cold air flow path 52' provides fluid communication between the hot air flow path 38' and the cold air flow path 40' downstream of the heater core 34' and upstream of the outlet and distribution section 22'.

The outlet and distribution section 22' of the second housing 14' includes a first outlet 100' and a second outlet 102'. The first outlet 100' and the second outlet 102' supply conditioned air from the hot air flow path 38', the cold air flow path 40', the secondary cold air flow path 52', or a combination thereof to the passenger compartment. Although the first outlet 100' is adapted to supply conditioned air to at least one floor delivery conduit (not shown) of a passenger side of the rear seat area of the passenger compartment, and the second outlet 102' is adapted to supply conditioned air to at least one headliner delivery conduit (not shown) of a passenger side of the rear seat area of the passenger compartment, it is understood that the outlets 100, 102 can be adapted to supply conditioned air to other areas of the vehicle as desired. It is also understood that the outlet and distribution section 22' of the second housing 14' may include other outlets (not shown) as desired.

In a narrowing region 104' of the outlet and distribution section 22' of the second housing 14', a mode door 106' is rotatably disposed therein. The mode door 106' is adapted to selectively open and close the first outlet 100' and the second outlet 102'. Any conventional mode door type can be used as desired.

In the embodiment shown, the mode door 106' includes a shaft 108', on which the mode door 106' is pivotable. A first end of the shaft 108' is received in an aperture (not shown) formed in the second housing 14'. A second end of the shaft 108' is received in an aperture (not shown) of the divider 17'. The shaft 108' is operatively connected to a fifth actuator mechanism 109' such as an electrical positioning motor, for example, for controlling a position of the mode door 106'. It is understood that the actuator mechanism 109' can be electrically operated, mechanically operated, or fluid operated, for example. It is also understood that the mode door 106' can be directly connected to the actuator mechanism 109'. In this case, the shaft 108' would not be necessary and could be removed from the mode door 106'.

As illustrated, the mode door 106' is substantially V-shaped in cross-section. It is understood that other shapes and types of mode doors 106' can be used as desired. A first sealing surface 110' and a second sealing surface 112' are formed on the mode door 106' at an angle of substantially 90 degrees with respect to one another. However, the sealing surfaces 110', 112' can be disposed at other angles relative to one another, as desired.

A cross-member 114' extends from the first sealing surface 110' to the second sealing surface 112'. The cross-member 114' is affixed to an end of each of the sealing surfaces 110', 112' at a predetermined distance D2'. It is understood that the predetermined distance can vary as desired without departing from the scope or spirit of the invention. Although the cross-member 114' includes a substantially constant radius R2', it is understood that the cross-member 114' can also be linear if desired.

The outlet and distribution section 22' of the second housing 14' includes a first housing wall 116', a second housing wall 118', and a third housing wall 120'. It is understood that the housing walls 116', 118', 120' can be formed integrally with other structures of the outlet and distribution section 22', or can be formed separately and mounted in the outlet and distribution section 22'.

The sealing surfaces 110', 112' are formed wherein at a first end stop position as shown in FIGS. 7B and 9B, the first sealing surface 110' is caused to abut the second housing wall 118' and the second sealing surface 112' is caused to abut the third housing wall 120', substantially closing the second outlet 102'. At a second end stop position indicated by the dashed lines, the first sealing surface 110' is caused to abut the first housing wall 116' and the second sealing surface 112' is caused to abut the second housing wall 118', substantially closing the first outlet 100'. Thus, at the end stop positions of the mode door 106', one of the first outlet 100' and the second outlet 102' is substantially closed to permit conditioned air to flow from the mixing and conditioning section 20' into one of the first outlet 100' and the second outlet 102', respectively.

As illustrated in FIGS. 8B and 10B, when the mode door 106' is not at the end stop positions, the first outlet 100' and the second outlet 102' are partially open to permit conditioned air to flow into the first outlet 100' and the second outlet 102'. A clearance gap J' is formed between the mode door 106' and the second housing wall 118'.

In the first outlet 100' of the outlet and distribution section 22' of the second housing 14', an air flow volume door 124' is rotatably disposed therein. The air flow volume door 124' is adapted to selectively open and close the first outlet 100'. It is understood that the air flow volume door 124' can be disposed in the second outlet 102' of the outlet and distribution section 22' of the second housing 14' if desired. Any conventional air flow volume door type can be used as desired.

In the embodiment shown, the air flow volume door 124' includes a shaft 126', on which the air flow volume door 124' is pivotable. A first end of the shaft 126' is received in an aperture (not shown) of the second housing 14'. A second end of the shaft 126' is received in an aperture (not shown) of the divider 17'. The shaft 126' is operatively connected to a sixth actuator mechanism 127' such as an electrical positioning motor, for example, for controlling a position of the air flow volume door 124'. It is understood that the actuator mechanism 127' can be electrically operated, mechanically operated, or fluid operated, for example. It is also understood that the air flow volume door 124' can be directly connected to the actuator mechanism 127'. In this case, the shaft 126' would not be necessary and could be removed from the air flow volume door 124'.

As illustrated in FIGS. 6, 7B, 8B, 9B, and 10B, the air flow volume door 124' is a butterfly-type flapper door. It is understood that other shapes and types of air flow volume doors 124' can be used as desired. A first sealing surface 128' and a second sealing surface 130' are formed on the air flow volume door 124' at an angle of substantially 180 degrees with respect to one another. It is understood that the sealing surfaces 128', 130' can be disposed at other angles relative to one another, as desired.

The first outlet 100' of the second housing 14' also includes a first housing wall 132' and a second housing wall 134'. It is understood that the housing walls 132', 134' can be formed integrally with other structures of the first outlet 100', or can be formed separately and mounted in the first outlet 100'.

At a first position as shown in FIGS. 7B and 9B, the air flow volume door 124' is substantially open to permit a volume of conditioned air to flow through the first outlet 100'. At an end stop position indicated by the dashed lines, the first sealing surface 128' is caused to abut the first housing wall 132' and the second sealing surface 130' is caused to abut the second housing wall 134', substantially closing the first outlet 100'. Thus, a volume of conditioned air flows from the mixing and conditioning section 20' into only the second outlet 102'. As illustrated in FIGS. 8B and 10B, when the air flow volume door 124' is not at the end stop position, the first outlet 100' is partially open to permit a volume of conditioned air less than the volume of conditioned air permitted to flow in the first position to flow therethrough.

The divider 17' is typically disposed between the first housing 12' and the second housing 14'. The divider 17' is adapted to separate conditioned air exiting the evaporator core 32' and the heater core 32' and flowing through the mixing and conditioning section 20' of the first housing 12' and the second housing 14'. In the embodiment shown the divider 17' separates the mixing and conditioning section 20' to facilitate independent control of a temperature of conditioned air delivered to the separate areas of the passenger compartment of the vehicle. The divider 17' is also adapted to separate the outlet and distribution section 22' of the first housing 12' and the second housing 14'. In the embodiment shown, the conditioned air is delivered from the module 10' to a driver side and a passenger side of the passenger compartment of the vehicle as desired. Additional doors and dividers may be disposed in the first housing 12' and the second housing 14' to control the temperature, a mode, and a volume of conditioned air delivered to other areas of the vehicle as desired.

Since the module 10' has substantially similar structure as the module 10, for simplicity, the operation for module 10' will be as described above.

In the embodiment shown in FIGS. 7A and 7B, a temperature and a volume of air flow to the floor area of the driver side and the passenger side of the passenger compartment are maximized with the blend doors 41', 140, the mode doors 66', 106', and the air flow volume doors 82', 124' in the first position and minimized with the blend doors 41', 140 the mode doors 66', 106', and the air flow volume doors 82', 124' in the second position indicated by the dashed lines.

In the embodiment shown in FIGS. 8A and 8B, the temperature and the volume of air flow to the floor area of the driver side of the passenger compartment are maximized with the blend door 41', the mode door 66', and the air flow volume door 82' in the first position and minimized with the blend door 41', the mode door 66', and the air flow volume door 82' in the second position indicated by the dashed lines. The temperature and the volume of air flow to the floor and headliner areas of the passenger side is between a maximum level and a minimum level with the blend door 140, the mode door 1061, and the air flow volume door 124' in the intermediate position.

In the embodiment shown in FIGS. 9A and 9B, the temperature and volume of air flow to the floor and headliner areas of the driver side are between a maximum level and a minimum level with the blend door 41', the mode door 66', and the air flow volume door 82' in the intermediate position. The temperature and the volume of air flow to the floor area of the passenger side is maximized with the blend door 140, the mode door 106', and the air flow volume door 124' in the first position and minimized with the blend door 140, the mode door 106', and the air flow volume door 124' in the second position indicated by the dashed lines.

In the embodiment shown in FIGS. 10A and 10B, the temperature and volume of air flow to the floor and headliner areas of the driver side and the passenger side are between a maximum level and a minimum level with the blend doors 41', 140, the mode doors 66', 106', and the air flow volume doors 82', 124' in the intermediate position.

The embodiments of the invention described herein minimize a cost of providing control and conditioning of air supplied to multiple zones of the passenger compartment of the vehicle. Providing the control modules 10, 10' eliminate the need for separate air handling systems for the passenger compartment of the vehicle. By eliminating the need for the separate air handling systems, weight and packaging requirements for the vehicle are also minimized. Accordingly, the flexibility and functionality of the air handling system of the vehicle is maximized when the system is expanded from supplying two zones to three or more. This expansion is accomplished with minimal modification to the module.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A control module for a heating, ventilating, and air conditioning system comprising:
a housing forming an air flow conduit therein, the housing having an inlet providing fluid communication between a supply of air and the air flow conduit and a center wall forming a first flow path and a second flow path in the air flow conduit;
an evaporator disposed in the housing assembly downstream of the inlet;
a heater core disposed in the housing assembly downstream of the evaporator;
at least one divider disposed in the housing assembly to partition the air flow conduit into a first sub-passage and a second sub-passage;
at least one blend door disposed in the air flow conduit, the at least one blend door selectively positionable between a first position and a second position, wherein the at least one blend door permits a flow of air through the first flow path and militates against the flow of air through the second flow path when positioned in the first position, and permits the flow of air through the second flow path and militates against the flow of air through the first flow path when positioned in the second position, the at least one blend door permitting the flow of air through the first flow path and the second flow path when positioned intermediate the first position and the second position, wherein a third flow path is formed between the at least one blend door and the center wall when the at least one blend door is positioned intermediate the first position and the second position to provide fluid communication between the first flow path and the second flow path downstream of the heater core and upstream of the at least one blend door;
a first mode door disposed in the first sub-passage, the first mode door selectively positionable between a first position and a second position, wherein the first mode door permits a flow of conditioned air through a first outlet of the first sub-passage and militates against the flow of conditioned air through a second outlet of the first sub-passage when positioned in the first position, and permits the flow of conditioned air through the second outlet of the first sub-passage and militates against the flow of conditioned air through the first outlet of the first sub-passage when positioned in the second position, and the first mode door permitting the flow of conditioned air through the first outlet of the first sub-passage and the second outlet of the first sub-passage when positioned intermediate the first position and the second position, wherein only the first mode door directs the flow of conditioned air into the first outlet of the first sub-passage and the second outlet of the first sub-passage, and wherein the first mode door is spaced from a wall of the housing forming a gap between a cross-member of the first mode door and the wall when positioned intermediate the first position and the second position;
a second mode door disposed in the second sub-passage, the second mode door selectively positionable between a first position and a second position, wherein the second mode door permits a flow of conditioned air through a first outlet of the second sub-passage and militates against the flow of conditioned air through a second outlet of the second sub-passage when positioned in the first position, and permits the flow of conditioned air through the second outlet of the second sub-passage and militates against the flow of conditioned air through the first outlet of the second sub-passage when positioned in the second position, and the second mode door permitting the flow of conditioned air through the first outlet of the second sub-passage and the second outlet of the second sub-passage when positioned intermediate the first position and the second position, wherein only the second mode door directs the flow of conditioned air into the first outlet of the second sub-passage and the second outlet of the second sub-passage, and wherein the second mode door is spaced from a wall of the housing forming a gap between a cross-member of the second mode door and the wall when positioned intermediate the first position and the second position; and
a plurality of volume doors, one of the volume doors disposed in at least one of the first outlet and the second outlet of the first sub-passage and another of the volume doors disposed in at least one of the first outlet and the second outlet of the second sub-passage, each of the volume doors selectively positionable between a first position and a second position, wherein each of the volume doors permits the flow of a volume of conditioned air through the at least one of the first outlet and the second outlet of at least one of the first sub-passage and the second sub-passage in the first position and militates against the flow of a volume of conditioned air through the at least one of the first outlet and the second outlet of at least one of the first sub-passage and the second sub-passage when positioned in the second position, and each of the volume doors when positioned intermediate the first position and the second position permitting the flow of a volume of conditioned air less than the volume of conditioned air permitted to flow through the at least one of the first outlet and the second outlet of at least one of the first sub-passage and the second sub-passage when positioned in the first position.

2. The control module according to claim 1, wherein the housing includes a first housing and a second housing.

3. The control module according to claim 2, wherein the at least one divider is disposed between the first housing and the second housing.

4. The control module according to claim 3, wherein the divider separates the first outlet and the second outlet of the first housing from the first outlet and the second outlet of the second housing.

5. The control module according to claim 4, wherein the first housing is configured to supply the conditioned air to a driver side of a passenger compartment of a vehicle.

6. The control module according to claim 4, wherein the second housing is configured to supply the conditioned air to a passenger side of the passenger compartment of the vehicle.

7. The control module according to claim 1, wherein at least one of the at least one blend door, the first mode door, the second mode door, and the volume doors is selectively positioned by an actuator.

8. The control module according to claim 1, further comprising a motor coupled to the housing, wherein the motor is capable of controlling a rate of air flow through the air flow conduit by selectively increasing and decreasing a rotational motion of a blower wheel disposed in the housing.

9. The control module according to claim 8, wherein the position of each of the at least one blend door, the first mode door, the second mode door, and the volume doors together with the motor selectively increasing and decreasing the rotational motion of the blower wheel, provide the first outlet and the second outlet of the first sub-passage and the first outlet and the second outlet of the second sub-passage with a desired temperature and volume of air flow.

10. The control module according to claim 1, wherein the first outlet of at least one of the first sub-passage and the second sub-passage is configured to supply the conditioned air to a floor area of a passenger compartment of a vehicle.

11. The control module according to claim 1, wherein the second outlet of at least one of the first sub-passage and the second sub-passage is configured to supply the conditioned air to a headliner area of a passenger compartment of a vehicle.

12. The control module according to claim 1, wherein the first outlet of at least one of the first sub-passage and the second sub-passage is configured to supply the conditioned air to a rear area of a passenger compartment of a vehicle.

13. The control module according to claim 1, wherein the second outlet of at least one of the first sub-passage and the second sub-passage is configured to supply conditioned air to a rear area of the passenger compartment.

14. A control module for a heating, ventilating, and air conditioning system for a vehicle comprising:
  a housing assembly having a first housing and a second housing forming an air flow conduit therein, the housing assembly having an inlet providing fluid communication between a supply of air and the air flow conduit and a center wall forming a first flow path and a second flow path in the air flow conduit, wherein the first housing is configured to supply conditioned air to a driver side of a passenger compartment and the second housing is configured to supply the conditioned air to a passenger side of the passenger compartment;
  an evaporator disposed in the housing assembly downstream of the inlet;
  a heater core disposed in the housing assembly downstream of the evaporator;
  at least one divider disposed between the first housing and the second housing to partition the air flow conduit into a first sub-passage and a second sub-passage;
  at least one blend door disposed in the air flow conduit, the at least one blend door selectively positionable between a first position and a second position, wherein the at least one blend door permits a flow of air through the first flow path and militates against the flow of air through the second flow path when positioned in the first position, and permits the flow of air through the second flow path and militates against the flow of air through the first flow path when positioned in the second position, the at least one blend door permitting the flow of air through the first flow path and the second flow path when positioned intermediate the first position and the second position, wherein a third flow path is formed between the at least one blend door and the center wall when the at least one blend door is positioned intermediate the first position and the second position to provide fluid communication between the first flow path and the second flow path downstream of the heater core and upstream of the at least one blend door;
  a first mode door disposed in the first sub-passage, the first mode door selectively positionable between a first position and a second position, wherein the first mode door permits a flow of conditioned air through a first outlet of the first sub-passage configured to supply the conditioned air to a floor area of the passenger compartment and militates against the flow of conditioned air through a second outlet of the first sub-passage configured to supply the conditioned air to a headliner area of the passenger compartment when positioned in the first position, and permits the flow of conditioned air through the second outlet of the first sub-passage and militates against the flow of conditioned air through the first outlet of the first sub-passage when positioned in the second position, and the first mode door permitting the flow of conditioned air through the first outlet of the first sub-passage and the second outlet of the first sub-passage when positioned intermediate the first position and the second position, wherein only the first mode door directs the flow of conditioned air into the first outlet of the first sub-passage and the second outlet of the first sub-passage, and wherein the first mode door is spaced from a wall of the housing forming a gap between a cross-member of the first mode door and the wall when positioned intermediate the first position and the second position;
  a second mode door disposed in the second sub-passage, the second mode door selectively positionable between a first position and a second position, wherein the second mode door permits a flow of conditioned air through a first outlet of the second sub-passage configured to supply the conditioned air to a floor area of the passenger compartment and militates against the flow of conditioned air through a second outlet of the second sub-passage configured to supply the conditioned air to a headliner area of the passenger compartment when positioned in the first position, and permits the flow of conditioned air through the second outlet of the second sub-passage and militates against the flow of conditioned air through the first outlet of the second sub-passage when positioned in the second position, the second mode door permitting the flow of conditioned air through the first outlet of the second sub-passage and the second outlet of the second sub-passage when positioned intermediate the first position and the second position, wherein only the second mode door directs the flow of conditioned air into the first outlet of the second sub-passage and the second outlet of the second sub-passage, and wherein the second mode door is spaced from a wall of the housing forming a gap between a cross-member of the second mode door and the wall when positioned intermediate the first position and the second position;
  a first volume door disposed in the first outlet of the first sub-passage, the first volume door selectively positionable between a first position and a second position, wherein the first volume door permits the flow of a volume of conditioned air through the first outlet of the first sub-passage in the first position and militates against the flow of a volume of conditioned air through the first outlet of the first sub-passage when positioned in the second position, the first volume door when positioned intermediate the first position and the second position permitting the flow of a volume of conditioned air less than the volume of conditioned air permitted to flow through the first outlet of the first sub-passage when positioned in the first position;
  a second volume door disposed in the first outlet of the second sub-passage, the second volume door selectively positionable between a first position and a second position, wherein the second volume door permits the flow of a volume of conditioned air through the first outlet of the second sub-passage in the first position and militates against the flow of a volume of conditioned air through the first outlet of the second sub-passage when positioned in the second position, the second volume door when positioned intermediate the first position and the second position permitting the flow of a volume of conditioned air less than the volume of conditioned air permitted to flow through the first outlet of the second sub-passage when positioned in a first position; and a motor coupled to the housing, the motor capable of controlling a rate of air flow through the air flow conduit by selectively increasing and decreasing a rotational motion of a blower wheel disposed in the housing.

15. The control module according to claim 14, wherein at least one of the at least one blend door, the first mode door, the second mode door, the first volume door, and the second volume door is selectively positioned by an actuator.

16. The control module according to claim 14, wherein the position of each of the at least one blend door, the first mode door, the second mode door, the first volume door, and the second volume door together with the motor selectively increasing and decreasing the rotational motion of the blower wheel, provide the first outlet and the second outlet of the first sub-passage and the first outlet and the second outlet of the second sub-passage with a desired temperature and volume of air flow.

17. The control module according to claim 14, wherein the first outlet of at least one of the first sub-passage and the second sub-passage is configured to supply the conditioned air to a rear area of the passenger compartment.

18. The control module according to claim 14, wherein the second outlet of at least one of the first sub-passage and the second sub-passage is configured to supply the conditioned air to a rear area of the passenger compartment.

19. A rear control module for a heating, ventilating, and air conditioning system for a vehicle comprising:

a housing assembly having a first housing and a second housing forming an air flow conduit therein, the housing assembly having a cold air inlet providing fluid communication between a supply of cold air and the air flow conduit and a center wall forming a hot air flow path and a cold air flow path in the air flow conduit, wherein the first housing is configured to supply conditioned air to a driver side of a passenger compartment and the second housing is configured to supply the conditioned air to a passenger side of the passenger compartment;

an evaporator disposed in the housing assembly downstream of the cold air inlet;

a heater core disposed in the housing assembly downstream of the evaporator;

at least one divider disposed between the first housing and the second housing to partition the air flow conduit into a first sub-passage and a second sub-passage;

at least one blend door disposed in the air flow conduit, the at least one blend door selectively positionable between a first position and a second position, wherein the at least one blend door permits a flow of hot air through the hot air flow path and militates against a flow of cold air through the cold air flow path when positioned in the first position, and permits the flow of cold air through the cold air flow path and militates against the flow of hot air through the hot air flow path when positioned in the second position, the at least one blend door permitting the flow of hot air through the hot air flow path and the flow of cold air through the cold air flow path when positioned intermediate the first position and the second position, wherein a secondary cold air flow path is formed between the at least one blend door and the center wall when the at least one blend door is positioned intermediate the first position and the second position to provide fluid communication between the hot air flow path and the cold flow path downstream of the heater core and upstream of the at least one blend door;

a first mode door disposed in the first sub-passage, the first mode door selectively positionable between a first position and a second position, wherein the first mode door permits a flow of conditioned air through a floor outlet of the first sub-passage configured to supply the conditioned air to a floor area of the passenger compartment and militates against the flow of conditioned air through a headliner outlet of the first sub-passage configured to supply the conditioned air to a headliner area of the passenger compartment when positioned in the first position, and permits the flow of conditioned air through the headliner outlet of the first sub-passage and militates against the flow of conditioned air through the floor outlet of the first sub-passage when positioned in the second position, and the first mode door permitting the flow of conditioned air through the floor outlet of the first sub-passage and the headliner outlet of the first sub-passage when positioned intermediate the first position and the second position, wherein only the first mode door directs the flow of conditioned air into the floor outlet of the first sub-passage and the headliner outlet of the first sub-passage, and wherein the first mode door is spaced from a wall of the housing forming a gap between a cross-member of the first mode door and the wall when positioned intermediate the first position and the second position;

a second mode door, the second mode door selectively positionable between a first position and a second position, wherein the second mode door permits a flow of conditioned air through a floor outlet of the second sub-passage configured to supply the conditioned air to a floor area of the passenger compartment and militates against the flow of conditioned air through a headliner outlet of the second sub-passage configured to supply the conditioned air to a headliner area of the passenger compartment when positioned in the first position, and permits the flow of conditioned air through the headliner outlet of the second sub-passage and militates against the flow of conditioned air through the floor outlet of the second sub-passage when positioned in the second position, the second mode door permitting the flow of conditioned air through the floor outlet of the second sub-passage and the headliner outlet of the second sub-passage when positioned intermediate the first position and the second position, wherein only the second mode door directs the flow of conditioned air into the floor outlet of the second sub-passage and the headliner outlet of the second sub-passage, and wherein the second mode door is spaced from a wall of the housing forming a gap between a cross-member of the second mode door and the wall when positioned intermediate the first position and the second position;

a first volume door disposed in the floor outlet of the first sub-passage, the first volume door selectively positionable between a first position and a second position, wherein the first volume door permits the flow of a volume of conditioned air through the floor outlet of the first sub-passage in the first position and militates against the flow of a volume of conditioned air through the floor outlet of the first sub-passage when positioned in the second position, the first volume door when positioned intermediate the first position and the second position permitting the flow of a volume of conditioned air less than the volume of conditioned air permitted to flow through the floor outlet of the first sub-passage when positioned in the first position;

a second volume door disposed in the floor outlet of the second sub-passage, the second volume door selectively positionable between a first position and a second position, wherein the second volume door permits the flow of a volume of conditioned air through the floor outlet of the second sub-passage in the first position and militates against the flow of a volume of conditioned air through the floor outlet of the second sub-passage when positioned in the second position, the second volume door when positioned intermediate the first position and the second position permitting the flow of a volume of conditioned air less than the volume of conditioned air permitted to flow through the floor outlet of the second sub-passage when positioned in the first position; and a motor coupled to the housing, the motor capable of controlling a rate of air flow through the air flow conduit by selectively increasing and decreasing a rotational motion of a blower wheel disposed in the housing, wherein the position of the at least one blend door, the mode doors, and the volume doors together with the motor selectively increasing and decreasing the rotational motion of the blower wheel, provide the floor outlet and the headliner outlet of the first sub-passage and the floor outlet and the headliner outlet of the second sub-passage with a desired temperature and volume of air flow.

20. The rear control module according to claim 19, further comprising:

a first volume door disposed in the headliner outlet of the first sub-passage, the first volume door selectively positionable between a first position and a second position, wherein the first volume door permits the flow of a volume of conditioned air through the headliner outlet of the first sub-passage in the first position and militates against the flow of a volume of conditioned air through the headliner outlet of the first sub-passage when positioned in the second position, the first volume door when positioned intermediate the first position and the second position permitting the flow of a volume of conditioned air less than the volume of conditioned air permitted to flow through the headliner outlet of the first sub-passage when positioned in the first position;

a second volume door disposed in the headliner outlet of the second sub-passage, the second volume door selectively positionable between a first position and a second position, wherein the second volume door permits the flow of a volume of conditioned air through the headliner outlet of the second sub-passage in the first position and militates against the flow of a volume of conditioned air through the headliner outlet of the second sub-passage when positioned in the second position, the second volume door when positioned intermediate the first position and the second position permitting the flow of a volume of conditioned air less than the volume of conditioned air permitted to flow through the headliner outlet of the second sub-passage when positioned in the first position.

* * * * *